US008688835B2

(12) United States Patent
Olsson

(10) Patent No.: US 8,688,835 B2
(45) Date of Patent: Apr. 1, 2014

(54) SERVICE ENABLEMENT/DISABLEMENT BASED ON SERVICE RELATIONSHIPS

(75) Inventor: David Olsson, Karlskrona (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 469 days.

(21) Appl. No.: 13/000,324

(22) PCT Filed: Jul. 2, 2008

(86) PCT No.: PCT/IB2008/052669
§ 371 (c)(1),
(2), (4) Date: Jan. 31, 2011

(87) PCT Pub. No.: WO2010/001198
PCT Pub. Date: Jan. 7, 2010

(65) Prior Publication Data
US 2011/0145408 A1 Jun. 16, 2011

(51) Int. Cl.
*G06F 15/16* (2006.01)
*G06F 15/173* (2006.01)

(52) U.S. Cl.
USPC ............................ 709/225; 709/223; 709/224

(58) Field of Classification Search
USPC .................. 709/203, 223, 224, 226, 228, 238
See application file for complete search history.

(56) References Cited

U.S. PATENT DOCUMENTS

| | | | | |
|---|---|---|---|---|
| 6,226,788 | B1 * | 5/2001 | Schoening et al. | 709/203 |
| 6,505,228 | B1 * | 1/2003 | Schoening et al. | 709/223 |
| 6,954,220 | B1 | 10/2005 | Bowman-Amuah | |
| 7,350,098 | B2 * | 3/2008 | Colrain et al. | 709/224 |
| 7,475,127 | B2 * | 1/2009 | Colrain et al. | 709/226 |
| 2007/0240134 | A1 | 10/2007 | Buragohain et al. | |

FOREIGN PATENT DOCUMENTS

EP 1 257 129 A1 11/2002

OTHER PUBLICATIONS

International Search Report, PCT Application No. PCT/IB2008/052669, May 12, 2009.
International Preliminary Report on Patentability, PCT Application No. PCT/IB2008/052669, Jan. 5, 2011.

* cited by examiner

*Primary Examiner* — Quang N Nguyen
(74) *Attorney, Agent, or Firm* — Myers Bigel Sibley & Sajovec, P.A.

(57) ABSTRACT

A network (100) may include a provisioning platform (120) and a group of nodes (130). The provisioning platform (120) may include a service management component (540) to define relationships between a group of services and processing logic (420). The processing logic (420) may receive a request to enable or disable a user for a first service, identify a second service that is required by the first service from the service management component (540), identify a first node (130-1 through 130-N) associated with the identified second service, and identify a second node (130-1 through 130-N) associated with the first service. The processing logic (420) may further transmit at least one first parameter to enable or disable the user at the identified first node (130-1 through 130-N), and transmit, when the user has been successfully enabled or disabled at the identified first node (130-1 through 130-N), at least one second parameter to enable or disable the user at the identified second node (130-1 through 130-N).

17 Claims, 19 Drawing Sheets

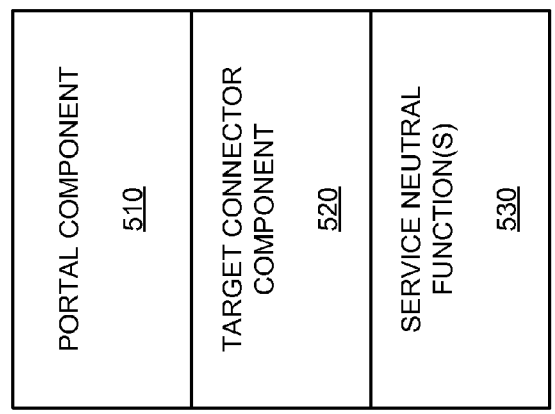
FIG. 5A

SERVICE ENABLEMENT/DISABLEMENT BASED ON SERVICE RELATIONSHIPS

CROSS REFERENCE TO RELATED APPLICATION

This application is a 35 U.S.C. §371 national stage application of PCT International Application No. PCT/IB2008/052669, filed on 2 Jul. 2008, the disclosure and content of which is incorporated by reference herein in its entirety. The above-referenced PCT International Application was published in the English language as International Publication No. WO 2010/001198 A1 on 7 Jan. 2010.

TECHNICAL FIELD

Embodiments consistent with the present invention relate generally to communication networks, and more particularly, to managing services in communication networks.

BACKGROUND

Service management systems often include a distributed architecture with different management systems tailored toward the particular environment with which the management system is associated. For example, a service management system may include a first management system for managing services and service nodes in a fixed network and a second management system for managing services and service nodes in a mobile network. The different management systems often operate independently, making management of the services between these different environments difficult. Moreover, these different management systems often have a lot of overlapping functions, which adds to network overhead.

The service management systems do not include a central point of knowledge about which services exist and how the services relate to each other. Thus, management of a large number of services is difficult. There exists a need for a service management system that is capable of efficiently managing services and service nodes.

SUMMARY

It is an object of the invention to overcome at least some of the above disadvantages and to provide an improved service management system.

Embodiments described herein may include systems and/or methods that enable/disable a user for a desired service or a desired service package. In one embodiment, a provisioning platform is provided that maintains information identifying the relationships between service and service packages. The provisioning platform may use the service relationship information to invoke a group of registered service neutral functions for the desired service and for each service that is required (either directly or indirectly) by the desired service. In this way, a very large number of services may be efficiently managed. The provisioning platform also makes it possible to manage nodes in an efficient way. For example, the provisioning platform considers configuration parameters for enabling/disabling users at nodes to belong to the services for which the users are being enabled/disabled. As such, it is possible to enable/disable a user at a node without manual intervention.

In an exemplary embodiment, systems and/or methods described herein may receive a request to enable or disable a user for a first service. The systems and/or methods may identify a second service that is required by the first service from a service management component that stores information about services and information indicating relationships between services. The systems and/or methods may execute, based on the received request, at least one first service neutral function to enable or disable the user for the identified second service. The systems and/or methods may further execute, after executing the at least one first service neutral function, at least one second service neutral function to enable or disable the user for the first service.

BRIEF DESCRIPTION OF THE DRAWINGS

FIG. 5A is an exemplary functional block diagram of a portion of the provisioning platform of FIG. 1;

DETAILED DESCRIPTION

The following detailed description refers to the accompanying drawings. The same reference numbers in different drawings may identify the same or similar elements. Also, the following detailed description does not limit the invention.

Embodiments described herein provide an ability to enable/disable a user for a service. As described herein, the enablement/disablement of the user for the service may include identifying other services that are required by the service and automatically enabling/disabling the user for the other services. A service, as used herein, may broadly represent software that an end user may consume directly or indirectly. For example, a service may include software relating to communications (e.g., data and/or voice), gaming, music, etc.

Figure 1:
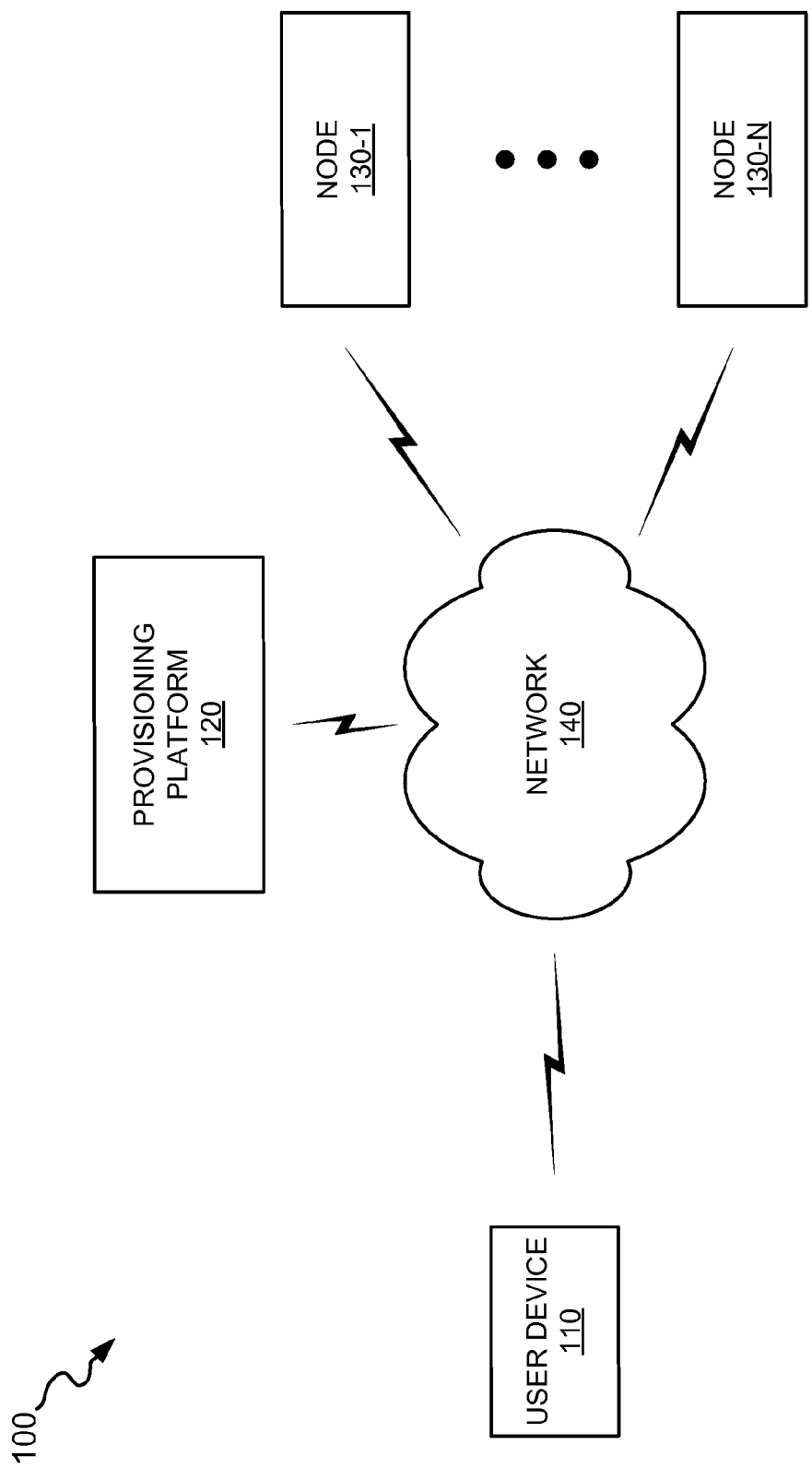
FIG. 1 is a diagram of an exemplary network in which systems and methods described herein may be implemented.

FIG. 1 is a diagram of an exemplary network 100 in which systems and methods described herein may be implemented. Network 100 may include a user device 110, a provisioning platform 120, a group of nodes 130-1 through 130-N (referred to collectively as "nodes 130"), and a network 140. A single user device 110, provisioning platform 120, and network 140 have been illustrated for simplicity. In practice, there may be more user devices, provisioning platforms, and/or networks.

User device 110 may include a device, such as a personal computer, a mainframe computer, a server, a lap top, a personal digital assistant (PDA), a telephone device, such as a wired or wireless telephone, etc., one or more threads or processes running on these devices or other types of devices, and/or one or more objects executable by these devices. In one implementation, user device 110 may allow a user to request and consume one or more services. User device 110 may connect to network 140 via any technique, such as wired or wireless connections.

Provisioning platform 120 may include one or more devices that manage services that are available in network 100. In one embodiment, provisioning platform 120 may allow users to be enabled or disabled for the services. Provisioning platform 120 may include one or more centrally located or distributed servers and/or other types of network devices. Provisioning platform 120 may connect to network 140 via any technique, such as wired or wireless connections.

Nodes 130 may include devices that allow users to consume services. In one embodiment, nodes 130 may include devices, such as service centers, that maintain subscriber information, such as subscriber identifiers, passwords, information identifying the service(s) to which a user has subscribed, etc. One example of node 130 may be a Multimedia Messaging Service (MMS) center that allows users to subscribe to multimedia messaging services. Nodes 130 may connect to network 140 via any technique, such as wired or wireless connections.

Network 140 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of network.

In some embodiments, one or more devices of network 100 may perform one or more of the tasks described as being performed by one or more other devices of network 100.

Figure 2:
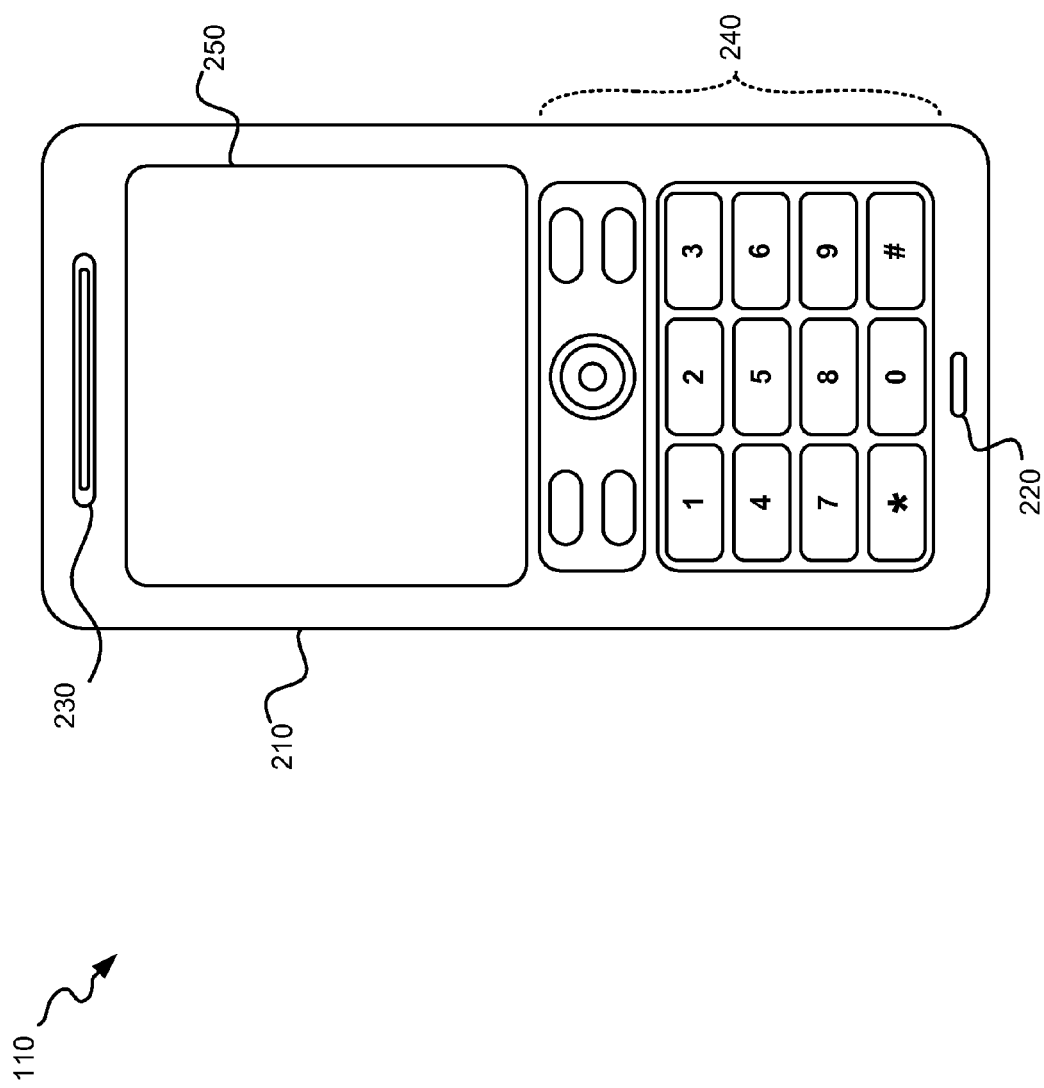
FIG. 2 is a diagram of an exemplary implementation of the user device of FIG. 1.

FIG. 2 is a diagram of an exemplary implementation of user device 110. In the example illustrated in FIG. 2, user device 110 is implemented as a cell phone. User device 110 may include a housing 210, a microphone 220, a speaker 230, a group of input elements 240, and a display 250.

Housing 210 may protect the components of user device 110 from outside elements. Microphone 220 may receive audible information from a user of user device 110. Speaker 230 may provide audible information to a user of user device 110. Input elements 240 may include control buttons and/or a keypad. The control buttons may permit a user to interact with user device 110 to cause user device 110 to perform one or more operations. For example, the control buttons may be used to cause user device 110 to transmit information, such as a request for a service. The keypad may include a standard telephone keypad. Display 250 may provide visual information to a user. For example, display 250 may display text input into user device 110, text and/or graphics received from another device, and/or information regarding incoming or outgoing calls or text messages, media, games, phone books, address books, the current time, etc.

Although FIG. 2 shows exemplary components of user device 110, in other implementations, user device 110 may contain fewer, different, or additional components than depicted in FIG. 2. In still other implementations, one or more components of user device 110 may perform the tasks described as being performed by one or more other components of user device 110.

Figure 3:
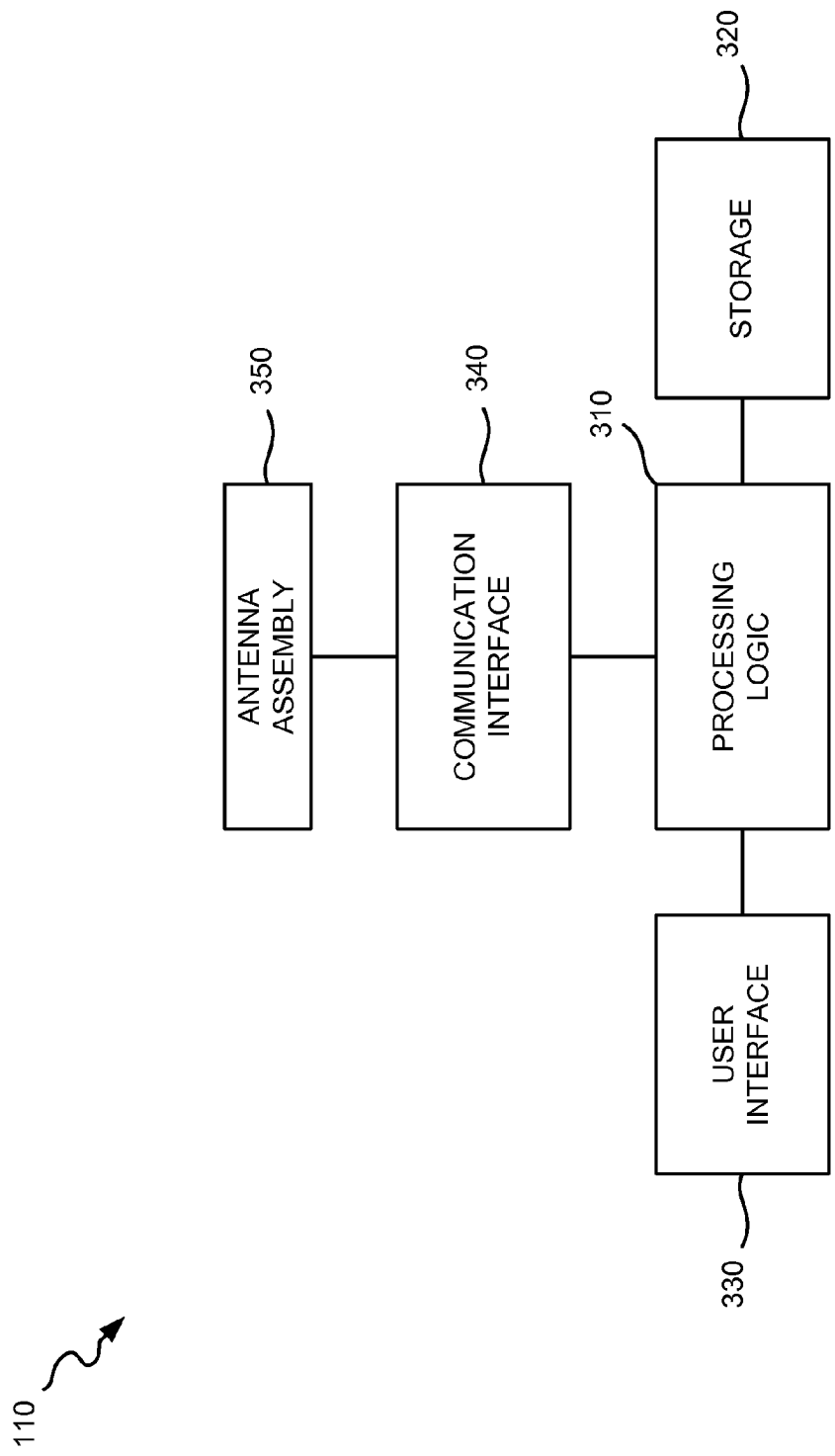
FIG. 3 is a diagram of exemplary components of the user device of FIG. 2.

FIG. 3 is a diagram of exemplary components of user device 110 of FIG. 2. As illustrated, user device 110 may include processing logic 310, storage 320, a user interface 330, a communication interface 340, and an antenna assembly 350. Processing logic 310 may include a processor, microprocessor, an application specific integrated circuit (ASIC), field programmable gate array (FPGA), or the like. Storage 320 may include a random access memory (RAM), a read only memory (ROM), and/or another type of memory to store data and instructions that may be used by processing logic 310 to control operation of user device 110 and its components.

User interface 330 may include mechanisms for inputting information to user device 110 and/or for outputting information from user device 110. Examples of input and output mechanisms might include a speaker (e.g., speaker 230) to receive electrical signals and output audio signals, a camera to receive image and/or video signals and output electrical signals, a microphone (e.g., microphone 220) to receive audio signals and output electrical signals, buttons (e.g., a joystick, input elements 240, etc.) to permit data and control commands to be input into user device 110, and a display (e.g., display 250) to output visual information.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and reception of the RF signals. Antenna assembly 350 may include one or more antennas to transmit and receive RF signals over the air. Antenna assembly 350 may receive RF signals from communication interface 340 and transmit the RF signals over the air. Antenna assembly 350 may further receive RF signals over the air and provide the RF signals to communication interface 340. In one implementation, for example, communication interface 340 may communicate with a network (e.g., a local area network (LAN), a wide area network (WAN), a telephone network, such as a wireless network, an IMS network, an intranet, the Internet, or a combination of networks).

Although FIG. 3 shows exemplary components of user device 110, in other implementations, user device 110 may contain fewer, different, or additional components than depicted in FIG. 3. In still other implementations, one or more components of user device 110 may perform the tasks described as being performed by one or more other components of user device 110.

Figure 4:
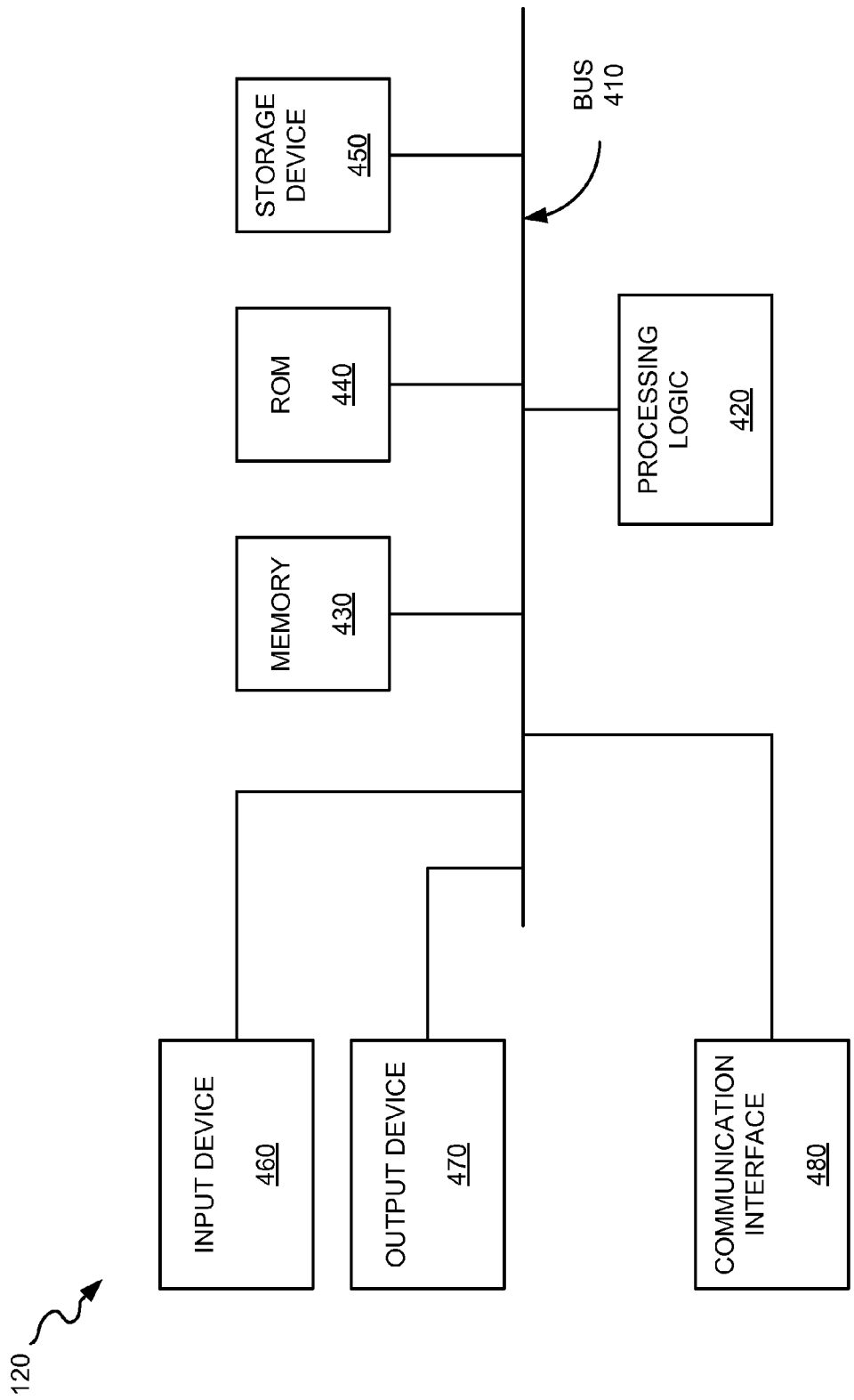
FIG. 4 is an exemplary configuration of the provisioning platform of FIG. 1.

FIG. 4 is an exemplary configuration of provisioning platform 120. As illustrated, provisioning platform 120 may include a bus 410, processing logic 420, a memory 430, a ROM 440, a storage device 450, an input device 460, an output device 470, and a communications interface 480. The number of components illustrated in FIG. 4 is provided for simplicity. In practice, it will be appreciated that provisioning platform 120 may include more buses, processing logic, memories, ROMs, storage devices, input devices, output devices, and communications interfaces that may be located on a single device or located on multiple, centrally located or distributed devices.

Bus 410 may permit communication among the components of provisioning platform 120. Processing logic 420 may include any type of processor or microprocessor that interprets and executes instructions. In other implementations, processing logic 420 may be implemented as or include an ASIC, FPGA, or the like. Memory 430 may include a RAM or another type of dynamic storage device that stores information and instructions for execution by processing logic 420.

ROM 440 may include a ROM device and/or another type of static storage device that stores static information and instructions for the processing logic 420. Storage device 450 may include some other type of magnetic or optical recording medium and its corresponding drive for storing information and/or instructions.

Input device 460 may include one or more devices that permit an operator to input information to provisioning platform 120, such as a keyboard, a keypad, a mouse, a pen, a microphone, one or more biometric mechanisms, and the like. Output device 470 may include one or more devices that output information to the operator, including a display, a printer, a speaker, etc.

Communication interface 480 may include any transceiver-like mechanism that enables provisioning platform 120 to communicate with other devices and/or systems, such as user device 110 and nodes 130. For example, communication interface 480 may include mechanisms for communicating with another device or system via a network, such as network 140.

As will be described in detail below, provisioning platform 120 may perform certain processes. Provisioning platform 120 may perform these and other processes in response to processing logic 420 executing software instructions contained in a computer-readable medium, such as memory 430. A computer-readable medium may include, for example, one or more physical and/or logical memory devices. The software instructions may be read into memory 430 from another computer-readable medium, such as storage device 450, or from another device via communication interface 480. The software instructions contained in memory 430 may cause processing logic 420 to perform processes that will be described later. Alternatively, hardwired circuitry may be used in place of or in combination with software instructions to implement processes described herein. Thus, systems and methods described herein are not limited to any specific combination of hardware circuitry and software.

FIG. 5A is an exemplary functional block diagram of an exemplary portion of provisioning platform 120. As illustrated, provisioning platform 120 may include a portal component 510, a target connector component 520, and one or more service neutral functions 530. Portal component 510, target component 520, and service neutral function(s) 530 may be implemented via a single device (e.g., a single server) or one or more different devices (e.g., different servers).

Portal component 510 may include one or more components that provide an interface via which a request to enable or disable a user for a service may be received. In one embodiment, portal component 510 may include a web-based interface. Portal component 510 may provide one or more graphical user interfaces that allow a user (e.g., a user of user device 110), a network administrator, etc. to provide information relating to the enablement/disablement request. The information may include, for example, information associated with the user (e.g., information identifying the user, information relating to user device 110, such as a network address, etc.) and information associated with the service being requested (e.g., information identifying the service, information identifying a version of the service, etc.).

Target connector component 520 may include one or more target connectors that allow provisioning platform 120 to communicate with nodes 130. In one embodiment, target connector component 520 may include a different target connector for each of nodes 130-1 through 130-N. Alternatively, a target connector in target connector component 520 may be associated with more than one of nodes 130-1 through 130-N. Each target connector may receive instructions and/or parameters from a service neutral function 530 and convert the instructions and/or parameters into a form that is compatible with one or more nodes 130 with which the target connector is associated.

Service neutral function(s) 530 may include one or more components that provide management support for services in network 100. A service neutral function is responsible for performing some of the work necessary in order to make a service available to a user. It may be associated with, or possibly invoked by, the service management platform. A service neutral function for a specific purpose, e.g. "managing device service software," may be common for all services (i.e. service neutral, but include software code and/or configuration for each specific service in need of management of device service software). A service neutral function may delegate some or all of its responsibilities to subordinate service neutral functions. For example, a service neutral function covering all device related aspects of the services might in turn call on a service neutral function managing device service software, and another service neutral function managing device service configuration. As a further example, a service neutral function is executed to perform a subset of the work necessary to make a service work for the end user of the particular service.

Figure 5B:
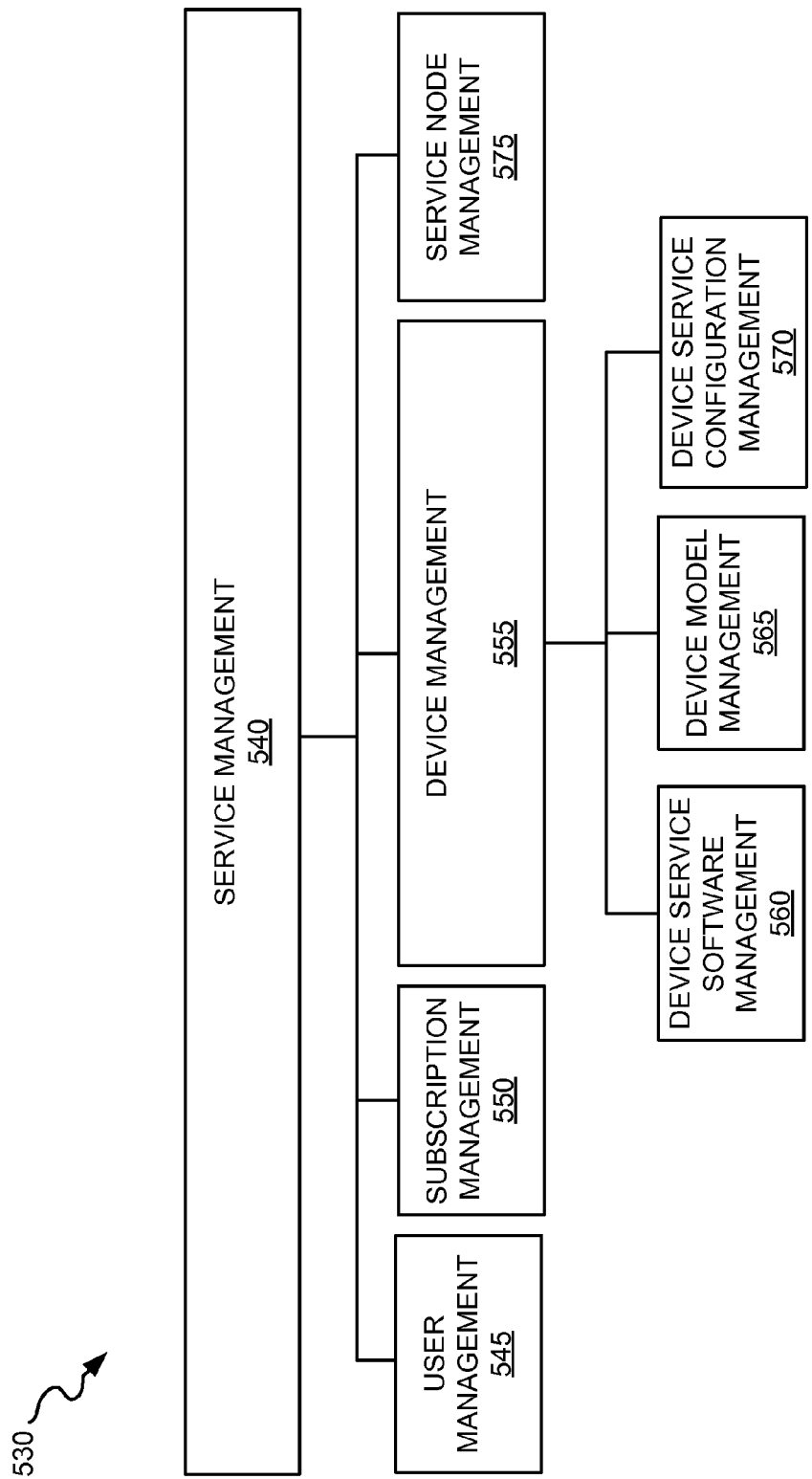
FIG. 5B is an exemplary diagram of the service neutral functions of FIG. 5A.

FIG. 5B is an exemplary diagram of service neutral function(s) 530. As illustrated, service neutral function(s) 530 may include a number of components, such as a service management component 540, a user management component 545, a subscription management component 550, a device management component 555, a device service software management component 560, a device model management component 565, a device service configuration management component 570, and a service node management component 575. Service management component 540, user management component 545, subscription management component 550, device management component 555, device service software management component 560, device model management component 565, device service configuration management component 570, and service node management component 575 may be implemented via a single device (e.g., a single server) or one or more different devices (e.g., different servers).

In one embodiment, service management component 540, user management component 545, subscription management component 550, device management component 555, device service software management component 560, device model management component 565, device service configuration management component 570, and service node management component 575 may be implemented in a hierarchical arrangement. For example, service management component 540 may correspond to a root node in the hierarchy (e.g., user management component 545, subscription management component 550, device management component 555, and service node management component 575 may be located below service management component 540 in the hierarchy). Further, device service software management component 560, device model management component 565, and device service configuration management component 570 may be located below device management component 555. In this arrangement, all calls to, for example, enable/disable a user for a service may be made to service management component 540, which may, in turn, call the other service neutral functions. Put another way, all calls to enable/disable a user for a service may start at the top of the hierarchy illustrated in FIG. 5B and propagate downwards. Other arrangements are possible.

Service management component 540 may include one or more components that maintain information about the services that are available in network 100 and the relationship (if any) between the services. For example, service management component 540 may store information that identifies service packages, the services that are included in the service packages, the service versions that are included in each service, that a particular service requires one or more other services, that a particular service requires one of two or more other services, etc. In the exemplary arrangement in FIG. 5B, service management component 540 may be configured to call user management component 545, subscription management component 550, device management component 555, and service node management component 575 to enable a user for a service (and the services that are required by the service). In some embodiments, service management component 540 may provide support for authorizing service administrators. Further information regarding service management component 540 is provided below with respect to FIG. 7.

User management component 545 may include one or more components that maintain information relating to users (e.g., a user of user device 110 who has subscribed or is attempting to subscribe to a service in network 100). The information may include, for example, information identifying the users. In one embodiment, user management component 545 may maintain relationships between different groups (e.g., of a group hierarchy) of users and/or relationships between users and groups.

Subscription management component 550 may include one or more components that maintain information as to which services users and/or groups are permitted to subscribe. Thus, subscription management component 550 may maintain relationships between services and users and/or groups of users.

Device management component 555 may include one or more components that maintain information relating to user devices, such as user device 110, in network 100. The information may include, for example, information about each unique user device 110 in network 100, information identifying a user device 110 with which each user is associated (possibly including the model of user device 110), information identifying user device(s) 110 that the user has previously used, etc. In the exemplary arrangement in FIG. 5B, device management component 555 may be configured to call device service software management component 560, device model management component 565, and device service configuration component 570 to prepare user device 110 for using a requested service.

Device service software management component 560 may include one or more components that maintain information relating to software for services available in network 100. The information may include, for example, information identifying the service software (e.g., including information about the particular version of the service software). In addition, device service software management component 560 may further obtain the identified service software and cause the software to be installed on user device 110.

Device model management component 565 may include one or more components that maintain information relating to user device models in network 100. The information may include, for example, information identifying the user device models and information identifying parameters and/or protocols to be used by user device 110 for a requested service. In some embodiments, device model management component 565 may obtain user device model information and/or the parameter/protocol information from a source internal or external to provisioning platform 120.

Device service configuration management component 570 may include one or more components that store and enforce rules that indicate which subscribers are to receive which device service configuration settings. As an example, a service may include an email service, and a device service configuration setting may include a setting specifying the email server from which emails are to be retrieved.

Service node management component 575 may include one or more components that maintain the relationships between services and nodes 130 with which the services are associated. For example, service node management component 575 may relate information identifying an MMS service with information identifying an MMS service center with which the MMS service is associated. Service node management component 575 may further include one or more components for enabling/disabling subscribers for services at nodes 130.

The functional components illustrated in FIGS. 5A and 5B are exemplary. In practice, provisioning platform 120 may include fewer, different, and/or additional functional components than illustrated in FIGS. 5A and 5B. In some embodiments, one or more functional components of provisioning platform 120 may perform one or more of the tasks described as being performed by one or more other functional components of provisioning platform 120.

Figure 6:
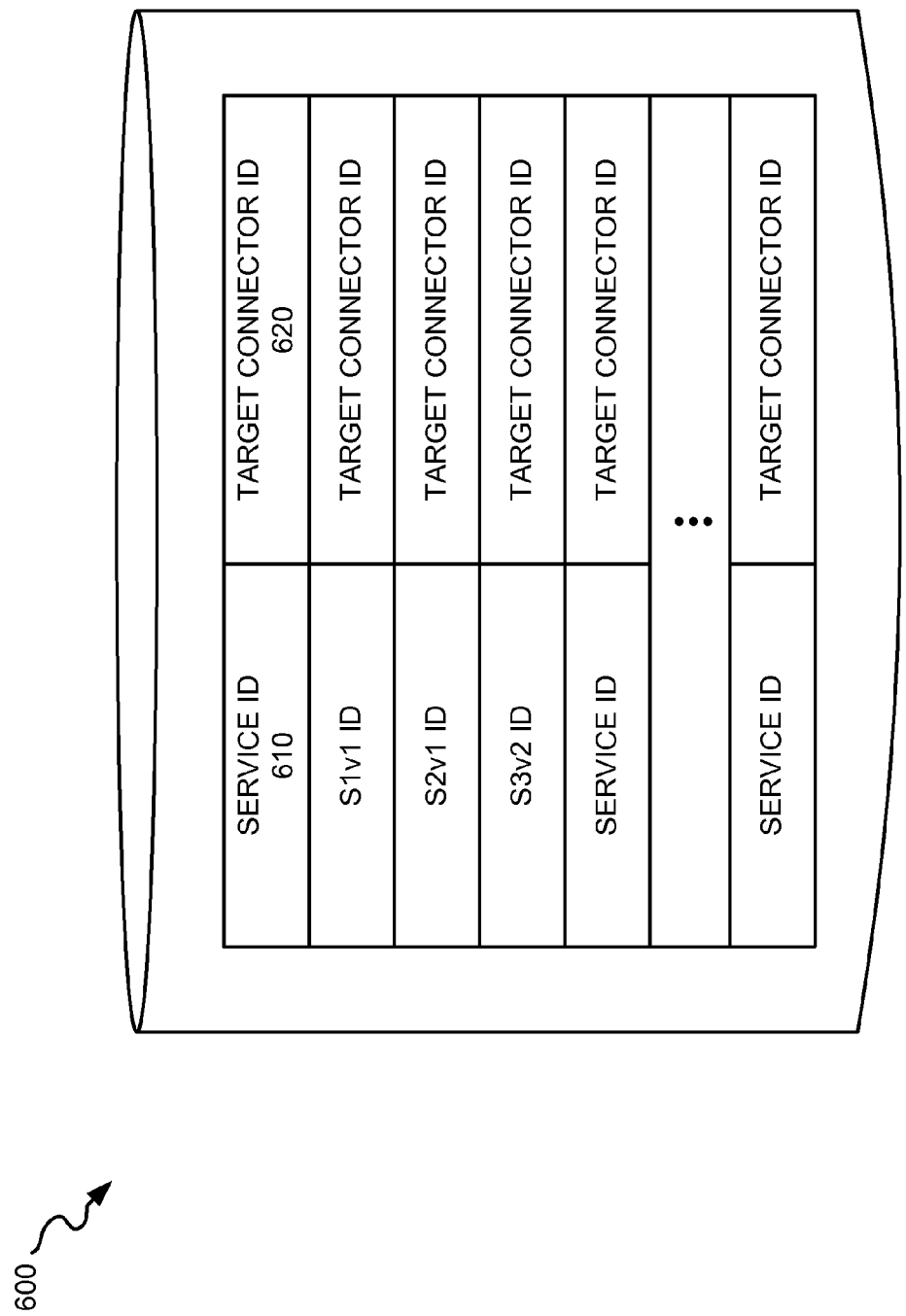
FIG. 6 is a diagram of an exemplary computer-readable medium that may be associated with the service node management component of FIG. 5.

FIG. 6 is a diagram of an exemplary computer-readable medium 600 that may be associated with service node management component 575 of provisioning platform 120. While one computer-readable medium is described below, it will be appreciated that computer-readable medium 600 may include multiple computer-readable media stored locally at provisioning platform 120, or stored at one or more different and possibly remote locations.

As illustrated, computer-readable medium 600 may maintain a group of entries in the following exemplary fields: a service identifier field 610 and a target connector identifier field 620. Computer-readable medium 600 may maintain additional or different information than illustrated in FIG. 6.

Service identifier field 610 may store a sequence of characters that identifies a service available in network 100. In one embodiment, the sequence of characters may be unique for that particular service. In one embodiment, service identifier field 610 may further identify, as illustrated in FIG. 6, a version of a service. For example, as illustrated in FIG. 6, service identifier field 610 may store an identifier for service 1, version 1, an identifier for service 2, version 1, and an identifier for service 3, version 2.

Target connector identifier field 620 may store a sequence of characters that identifies a target connector in target connector component 520. In one embodiment, the sequence of characters may correspond to a name associated with a service and/or node. Each target connector identified in target connector identifier field 620 may be associated with one or more services identified in service identifier field 610. For example, service 1, version 1 may be associated with the same target connector as service 2, version 1.

Figure 7:
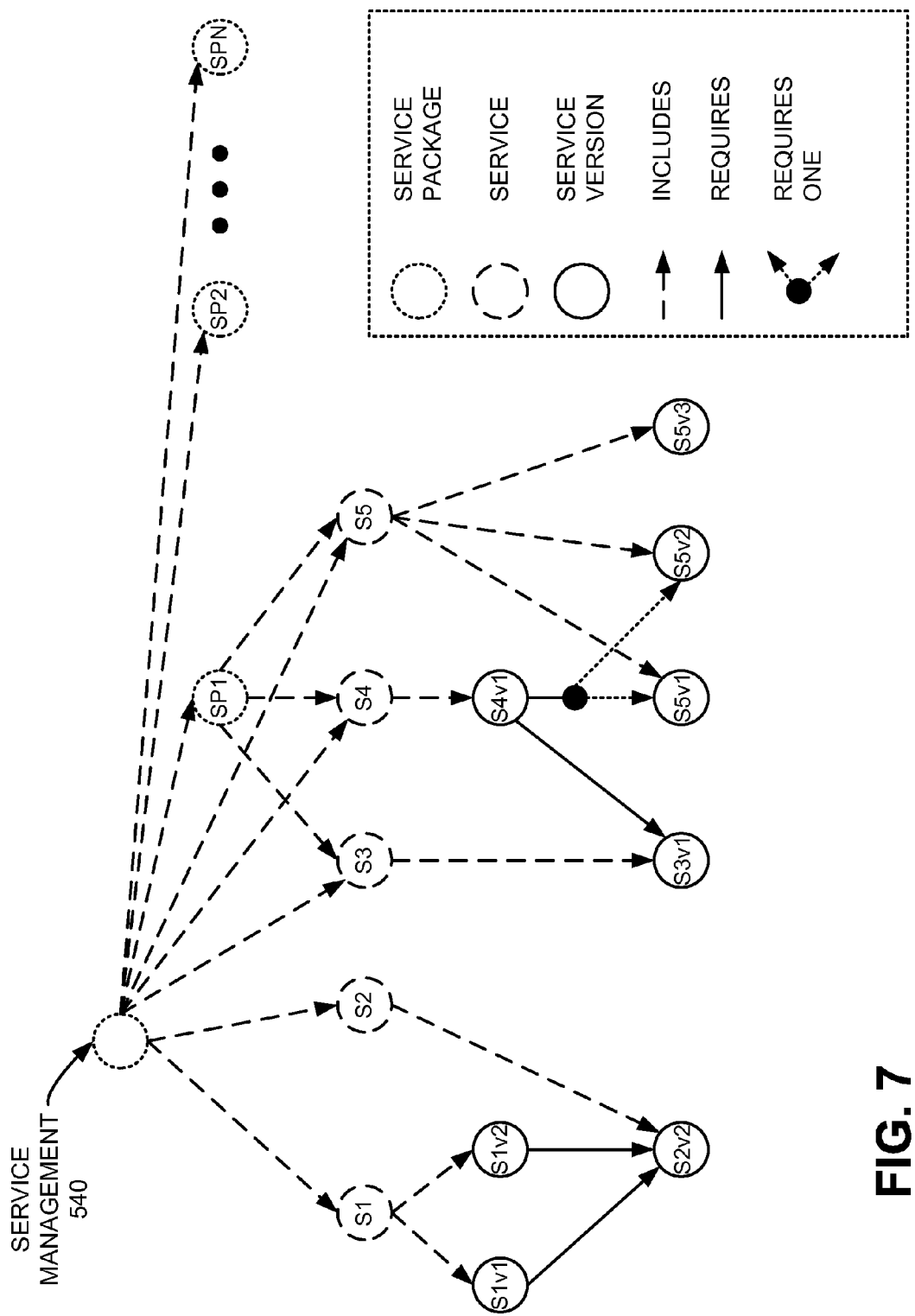
FIG. 7 is a diagram of exemplary service relationships that may be maintained by the service management component of FIG. 5.

FIG. 7 is a diagram of exemplary service relationships that may be maintained by service management component 540. As illustrated, service management component 540 may include a number of services (numbered 1 to 5 in this example) and a number of service packages (SPs) (numbered 1-N in this example). Service 1 may include two versions (numbered as 1 and 2). Service 2 may include a single version (numbered as 2). As illustrated in FIG. 7, versions 1 and 2 of service 1 may require service 2, version 2. Put another way, enablement or disablement of a user for either version 1 or version 2 of service 1 may require that the user also be enabled/disabled for service 2, version 2.

As further illustrated in FIG. 7, service package 1 may include three services (numbered as 3, 4, and 5). Service 3 may include a single version (numbered as 1). Service 4 may also include a single version (numbered as 1). Service 5 may include three versions (numbered as 1, 2, and 3). As illustrated in FIG. 7, service 4, version 1 may require service 3, version 1. Service 4, version 1 may further require one of service 5, version 1, or service 5, version 2. Thus, enablement or disablement of a user for service 4, version 1 may require that the user also be enabled/disabled for service 3, version 1 and either version 1 or version 2 of service 5.

The types of relationships between services and service packages provided in FIG. 7 are exemplary. Other types of relationships are possible. For example, a particular service version may require one of two different versions of another service, where each of the different versions may require a different version of yet another service. Thus, the particular service may require one of a first pair of services/versions or a second pair of services/versions.

Figure 8:
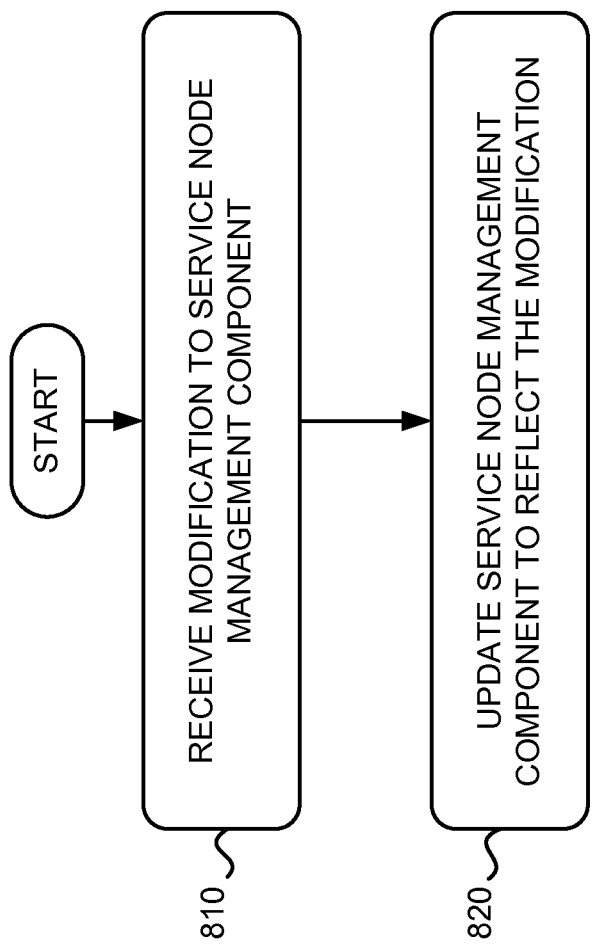
FIG. 8 is a flowchart of an exemplary process for modifying the service node management component of FIG. 5.

FIG. 8 is a flowchart of an exemplary process for modifying service node management component 575. In one embodiment, the process described in FIG. 8 may be performed by provisioning platform 120. In another embodiment, some or all of the exemplary process described below may be performed by another device or combination of devices, including or excluding provisioning platform 120.

The exemplary process may begin with provisioning platform 120 receiving a modification to service node management component 575 (block 810). In one embodiment, a network administrator (or other type of operator) may access provisioning platform 120 via, for example, portal component 510. Provisioning platform 120 may authenticate the network administrator prior to allowing the network administrator to make any modifications to service node management component 575. Provisioning platform 120 may provide one or more graphical user interfaces that allow the network administrator to perform a number of modifications to service node management component 575, including, for example, adding a service entry, removing a service entry, registering a target connector of target connector component 520 (which may include assigning a name for the particular node (i.e., one or more of nodes 130-1 through 130-N) with which the target connector is associated), un-registering a target connector of target connector component 520, associating a target connector of target connector component 520 with a service, removing an association of a target connector of target connector component 520 with a service, adding a parameter to a service/node 130-1 through 130-N combination, removing a parameter from a service/node 130-1 through 130-N combination, adding a default value to a registered parameter (where, for example, the default value may be used if no parameter value exists), removing a default value from a registered parameter, specifying that a value of a parameter is to be the same as the value of another parameter, specifying that a value of a parameter should no longer be the same as the value of another parameter, enabling a user for a service, and disabling a user for a service.

Provisioning platform 120 may update service node management component 575 to reflect the modification (block 820). For example, provisioning platform 120 may store the modification in a memory, such as memory 430.

Figure 9:
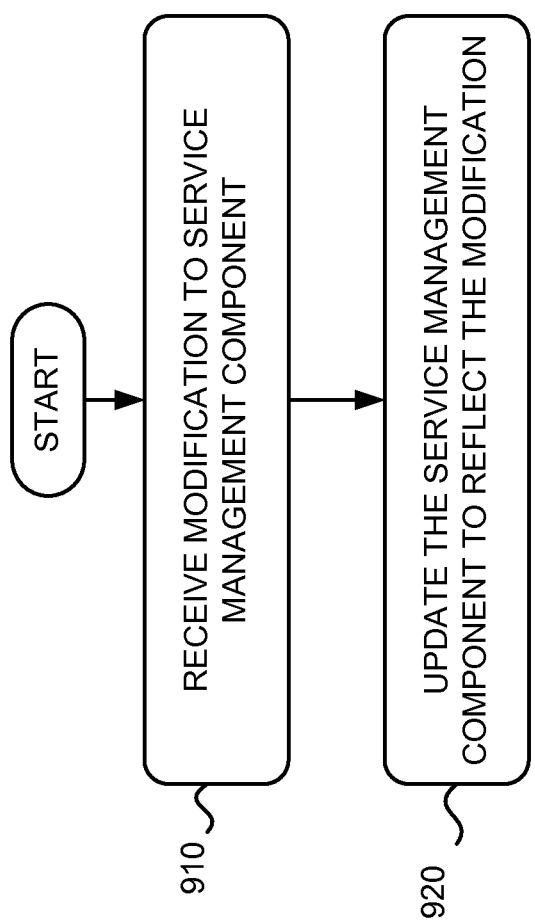
FIG. 9 is a flowchart of an exemplary process for modifying the service management component of FIG. 5.

FIG. 9 is a flowchart of an exemplary process for modifying service management component 540. In one embodiment, the process described in FIG. 9 may be performed by provisioning platform 120. In another embodiment, some or all of the exemplary process described below may be performed by another device or combination of devices, including or excluding provisioning platform 120.

The exemplary process may begin with provisioning platform 120 receiving a modification to service management component 540 (block 910). In one embodiment, a network administrator (or other type of operator, such as a service provider) may access provisioning platform 120 via, for example, portal component 510. Provisioning platform 120 may authenticate the network administrator prior to allowing the network administrator to make any modifications to service management component 540. Provisioning platform 120 may provide one or more graphical user interfaces that allow the network administrator to perform a number of modifications to service management component 540, including, for example, creating a service entry, removing a service entry, creating a service version entry, removing a service version entry, creating a service package, removing a service package, specifying that a service is part of a service package, specifying that a service is no longer a part of a service package, specifying that a service package is part of another service package, specifying that a service package is no longer part of another service package, specifying that a service version requires a version of another service to operate properly, specifying that a service version no longer requires a version of another service, specifying that a service version requires one of a number of versions of other services to operate properly, specifying that a service version no longer requires one of a number of versions of other services to operate properly, registering a service neutral function 530, and un-registering a service neutral function 530.

Provisioning platform 120 may update service management component 540 to reflect the modification (block 920). For example, provisioning platform 120 may store the modification in a memory, such as memory 430.

Figure 10:
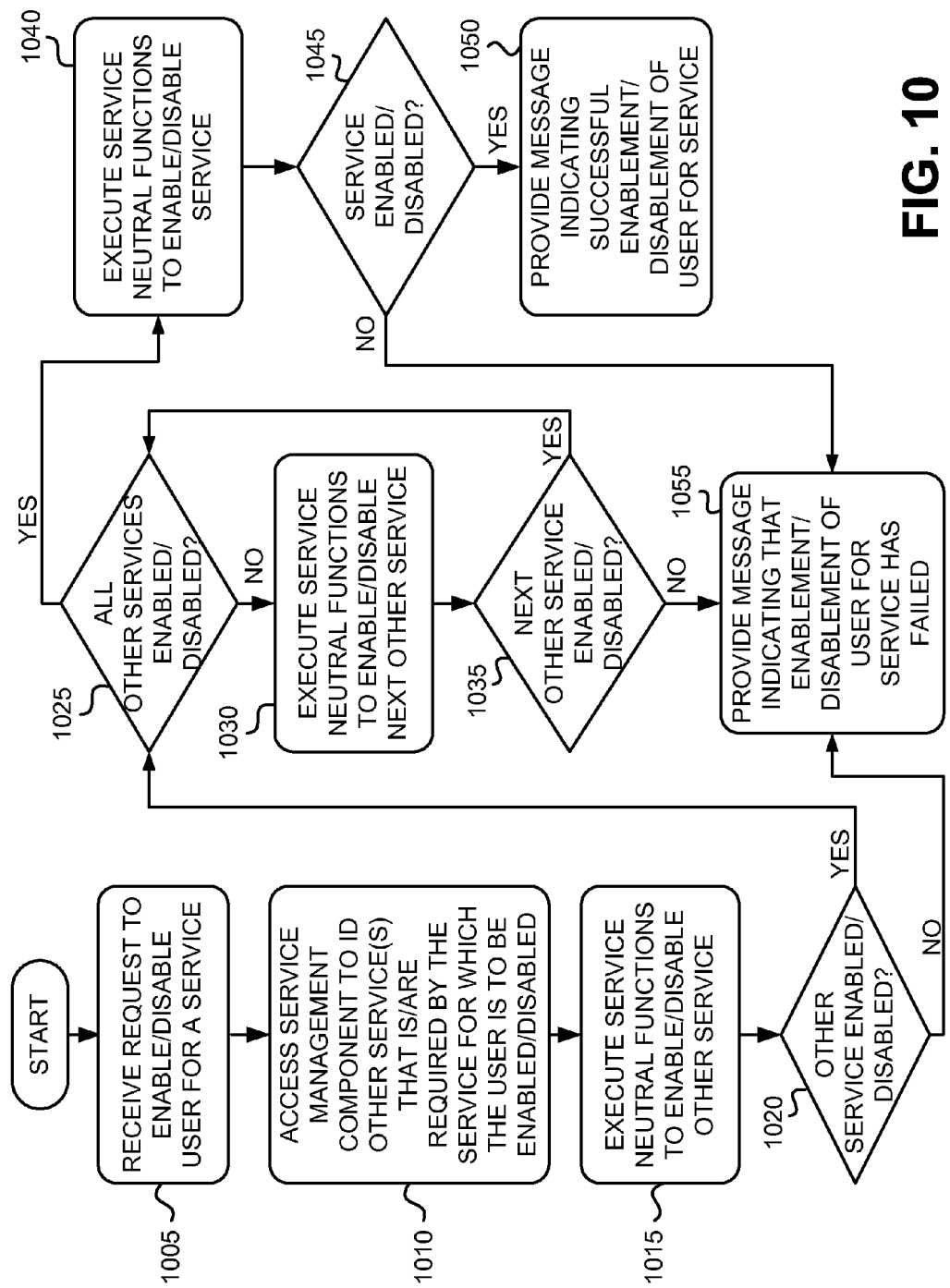
FIGS. 10-12 is a flowchart of an exemplary process for enabling/disabling a user for a service.

FIG. 10 is a flowchart of an exemplary process for enabling/disabling a user for a service. In one embodiment, the process described in FIG. 10 may be performed by provisioning platform 120. In another embodiment, some or all of the exemplary process described below may be performed by another device or combination of devices, including or excluding provisioning platform 120.

The exemplary process may begin with provisioning platform 120 receiving a request to enable/disable a user for a service (block 1005). A user (or other type of operator) may access provisioning platform 120 via portal component 510. In one embodiment, provisioning platform 120 may authenticate the user. If the user is properly authenticated, provisioning platform 120 may provide one or more graphical user interfaces that allow the user to request the enablement/disablement for the service. The request may include, for example, information identifying the service (and possibly the service version) and information associated with the user, such as a user identifier, information relating to user device 110 with which the user is associated, etc.

Provisioning platform 120 may identify another service/services that is/are required by the service for which the user is to be enabled/disabled (block 1010). For example, in response to receiving the request, provisioning platform 120 may call service management component 540. Based on the service relationships defined by service management component 540, provisioning platform 120 may identify a service version for the service requested by the user. In one embodiment, provisioning platform 120 may identify the latest version of the service. Provisioning platform 120 may also identify all other service versions that are required for the version of the requested service to operate. As an example and with reference to FIG. 7, assume that a user requests service 4 (i.e., version 1). Provisioning platform 120 may determine that one service version exists for service 4. Provisioning platform 120 may further determine that service 4, version 1 requires service 3, version 1 and one of version 1 or version 2 of service 5.

Provisioning platform 120 may execute (or call) one or more service neutral functions 530 to enable/disable the user for the identified version of one of the other services required by the requested service (block 1015). If multiple other services exist that depend from one another (e.g., service 1, version 1 is the requested service and it requires service 2, version 1, which in turn requires service 3, version 2), provisioning platform 120 may select the lowest other service in the chain (e.g., service 3, version 2 in this example). In one embodiment, provisioning platform 120 may execute (or call) each registered service neutral function in service neutral function 530. For example, as described in further detail below with respect to FIG. 11, provisioning platform 120 (e.g., service management component 540) may call (or execute) user management component 545, subscription management component 550, device management component 555 (which may call device service software management component 560, device model management component 565, and device service configuration management component 570), and service node management component 570 to enable/disable the user for the identified version of the other service. In some situations, the execution of a service neutral function 530 may not be needed. However, provisioning platform 120 may still execute all of the registered service neutral functions 530 even though no action is needed from a particular service neutral function 530. In other embodiments, a subset of the registered service neutral functions 530 may be executed for a version of a first service and a different subset of the registered service neutral functions 530 may be executed for a version of a second, different service. Thus, the same service neutral functions 530 may not be executed for all services.

Provisioning platform 120 may determine whether the user has been successfully enabled/disabled for the other service (block 1020). In one embodiment, execution of each service neutral function 530 may result in an indication of successful execution or unsuccessful execution. For example, execution of subscription management component 550 for the other service may result in a determination of whether the user is permitted to subscribe to the other service. Subscription management component 550 may provide an indication that the user is permitted or is not permitted to subscribe to the other service. If execution of any service neutral function 530 results in an indication of unsuccessful execution (e.g., the user is not permitted to subscribe to the other service), provisioning platform 120 may determine that the user cannot be enabled/disabled for the other service (block 1020—NO). If each of the registered service neutral functions 530 are successfully executed, provisioning platform 120 may determine that the user has been successfully enabled/disabled for the other service (block 1020—YES).

If the user has been successfully enabled/disabled for the other service (block 1020—YES), provisioning platform 120 may determine whether the user has been enabled/disabled for all of the other services required by the requested service (block 1025). If another service exists for which the user needs to be enabled/disabled (block 1025—NO), provisioning platform 120 may execute (or call) one or more service neutral functions 530 to enable/disable the user for the identified version of the next other service required by the requested service (block 1030). As indicated above, provisioning platform 120 may execute each registered service neutral function in service neutral function 530. In other embodiments, a set of the registered service neutral functions 530 may be executed in block 1030 that is different than the set of registered service neutral functions 530 that were executed in block 1015.

Provisioning platform 120 may determine whether the user has been successfully enabled/disabled for the next other service (block 1035). As indicated above, execution of each service neutral function 530 may result in an indication of successful execution or unsuccessful execution. If execution of any service neutral function 530 results in an indication of unsuccessful execution, provisioning platform 120 may determine that the user cannot be enabled/disabled for the next other service (block 1035—NO). If each of the registered service neutral functions 530 are successfully executed, provisioning platform 120 may determine that the user has been successfully enabled/disabled for the next other service (block 1035—YES).

If the user has been successfully enabled/disabled for the next other service (block 1035—YES), processing may return to block 1025 with provisioning platform 120 determining whether the user has been enabled/disabled for all of the other services required by the requested service. If, in block 1025, provisioning platform 120 determines that the user has been enabled/disabled for all other services required by the requested service (block 1025—YES), provisioning platform may execute (or call) one or more service neutral functions 530 to enable/disable the user for the identified version of the requested service (block 1040). As indicated above, provisioning platform 120 may execute each registered service neutral function in service neutral function 530. In other embodiments, a set of the registered service neutral functions 530 may be executed in block 1040 that is different than the set of registered service neutral functions 530 that were executed in block 1015 and/or block 1030.

Provisioning platform 120 may determine whether the user has been successfully enabled/disabled for the requested service (block 1045). As indicated above, execution of each service neutral function 530 may result in an indication of successful execution or unsuccessful execution. If each of the registered service neutral functions 530 are successfully executed, provisioning platform 120 may determine that the user has been successfully enabled/disabled for the requested service (block 1045—YES). In this situation, provisioning platform 120 may provide a message indicating that the user has been successfully enabled/disabled for the requested service (block 1050). The message may further identify the other services (and possibly versions) for which the user has been enabled/disabled.

If execution of any service neutral function 530 results in an indication of unsuccessful execution, provisioning platform 120 may determine that the user cannot be enabled/disabled for the requested service (blocks 1020, 1035, 1045—NO). In this situation, provisioning platform 120 may abort the enablement/disablement of any services for which the user has not yet been enabled/disabled. For example, if, in the example given above, provisioning platform 120 determines that the user cannot be enabled/disabled for service S3v2, provisioning platform 120 may abort the enablement/disablement of the user for services S2v1 and S1v1. Provisioning platform 120 may provide a message indicating that the user has not been successfully enabled/disabled for the requested service. The message may further identify the particular services (possibly including versions) where the enablement/disablement failed and why the enablement/disablement failed. Additionally or alternatively, provisioning platform 120 may perform a rollback feature where, for example, provisioning platform 120 may attempt to enable the user for a different (e.g., earlier) version of the particular service for which the user could not been enabled or different (e.g., earlier) version of the requested service. Further, service neutral functions 530 may be extended to make an initial determination prior to performing the blocks above, such as determining whether enablement of the user for the particular service is possible. Such an initial determination (or "dry-run") may be made before executing the service neutral functions 530 for the particular service. For example, service management component 540 (or another component) may provide an instruction, such as a Boolean instruction of the form "is EnablementOfUserPossible([user],[service])," to service neutral functions 530 to cause service neutral functions to make the initial determination. In one embodiment, the initial determination (or "dry-run") may be propagated down recursively. For example, an initial determination as to whether it is possible to enable a user for service A may lead to an initial determination of whether it will be possible to enable the same user for dependent service B.

Figure 11:
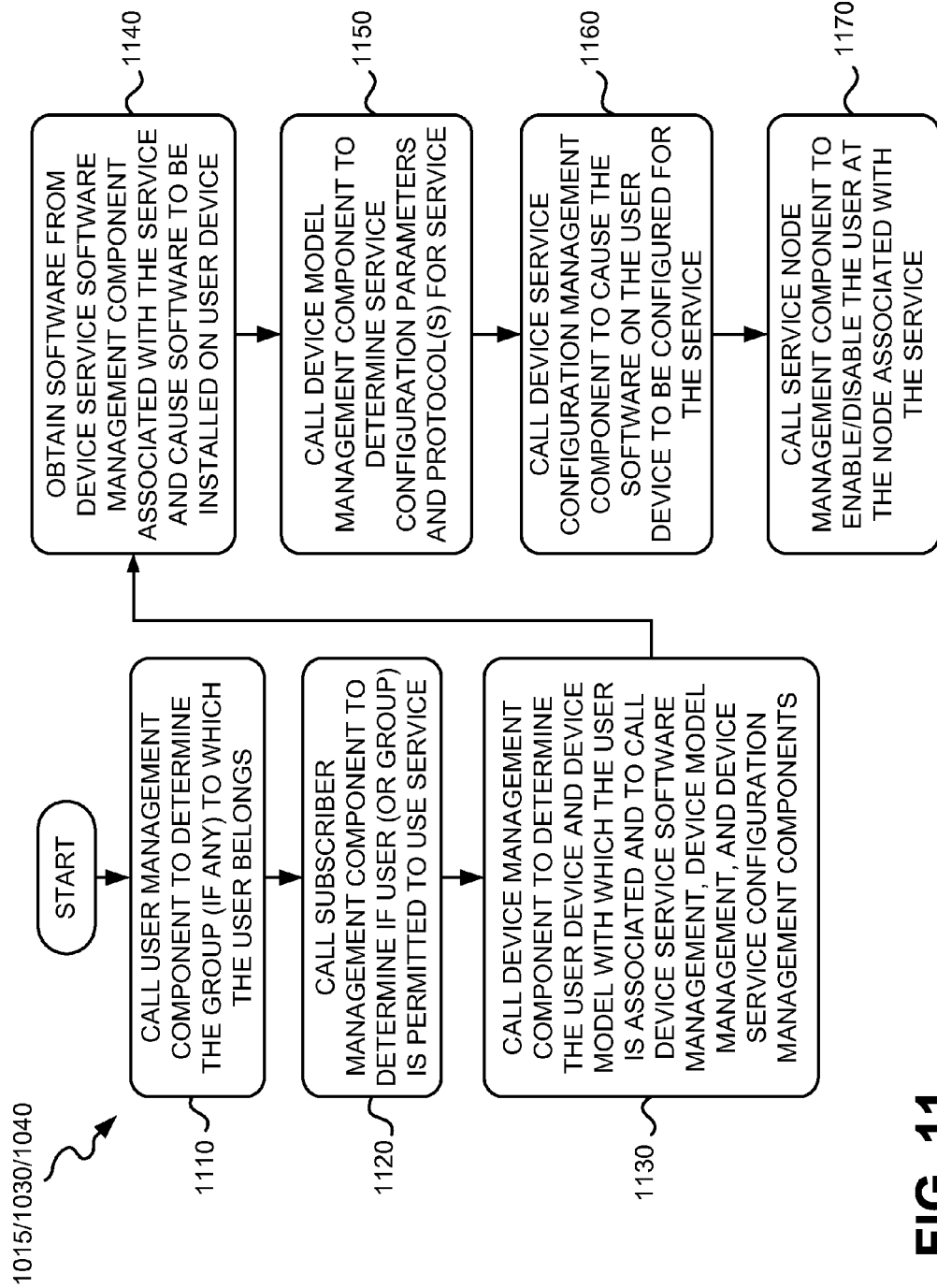

FIG. 11 is a flowchart of an exemplary process for executing service neutral functions 530 to enable/disable a user for a service (as described above in connection with blocks 1015, 1030, and 1040). In one embodiment, the process described in FIG. 11 may be performed by provisioning platform 120. In another embodiment, some or all of the exemplary process described below may be performed by another device or combination of devices, including or excluding provisioning platform 120.

The exemplary process may begin with provisioning platform 120 (e.g., service management component 540) calling user management component 545 to determine the group or groups to which the user belongs (block 1110). User management component 545 may provide an indication of a group (or groups) to which the user belongs (successful execution) or an indication, for example, that the user cannot be identified by user management component 545 (unsuccessful execution).

Provisioning platform 120 (e.g., service management component 540) may call subscription management component 550 to determine if the user is permitted to use the particular service (block 1120). For example, provisioning platform 120 may use an identifier associated with the user (e.g., obtained from the request) to lookup the services to which the user is permitted to subscribe. Subscription management component 550 may provide an indication that the user is either permitted to subscribe to the service (successful execution) or is not permitted to subscribe to the service (unsuccessful execution). In some embodiments, subscription management component 550 may make the determination on a service version basis or a service package basis.

Provisioning platform 120 (e.g., service management component 540) may call device management component 555 to determine a user device 110 and device model with which the user is associated (block 1130). For example, provisioning platform 120 may use an identifier associated with the user and/or an identifier associated with user device 110 (e.g., obtained from the request or via a lookup using an identifier associated with the user) to lookup the type of user device 110 and the model of user device 110. Device management component 555 may provide an indication of the type and model of user device 110 (successful execution) or that the type and model of user device 110 is not able to be determined (unsuccessful execution). In one embodiment, device management component 555 may call device service software management component 560, device model management component 565, and device service configuration management component 570.

Thus, provisioning platform 120 (e.g., device management component 555) may call device service software management component 560 to obtain software for the version of the particular service (block 1140). For example, provisioning platform 120 (e.g., device service software management component 560) may use an identifier associated with the service version to obtain the appropriate software from device service software management component 560. Provisioning platform 120 (e.g., device service software management component 560) may cause the software to be installed on user device 110 (block 1140). For example, provisioning platform 120 may cause the software to be transmitted to user device 110 via a network, such as network 140. Device service software management component 560 may provide an indication that the software was either successfully installed on user device 110 (successful execution) or was not successfully installed on user device 110 (unsuccessful execution).

Provisioning platform 120 (e.g., device management component 555) may call device model management component 565 to determine parameters and/or protocols to be used by user device 110 for the particular service (block 1150). For example, provisioning platform 120 may use an identifier associated with user device 110 to lookup the parameters and/or protocols to be used by the particular model of the user device 110 for consuming the service. Device model management component 565 may provide an indication of the parameters and/or protocols to be used in consuming the service (successful execution) or that the parameters and/or protocols cannot be identified (unsuccessful execution). In some embodiments, device model management component 565 may make the determination on a service version basis.

Provisioning platform 120 (e.g., device management component 555) may call device service configuration management component 570 to cause the installed software to be configured for the particular service (block 1160). For example, provisioning platform 120 may pass certain parameters to user device 110 to cause user device 110 to configure the newly installed software in a particular manner. Device service configuration management component 570 may provide an indication that either the software has been successfully configured on user device 110 (successful execution) or has not been successfully configured on user device 110 (unsuccessful execution).

Provisioning platform 120 (e.g., service management component 540) may call service node management component 575 to enable/disable the user at one or more of nodes 130-1 through 130-N associated with the particular service (block 1170). For example, provisioning platform 120 may send instructions to the node which may cause the node to enable the user (e.g., as a new user for the service) or disable the user for the service. Service node management component 575 may provide an indication either that the user has been successfully enabled/disabled on the node (successful execution) or that the user has not been successfully enabled/disabled on the node (unsuccessful execution).

Figure 12:
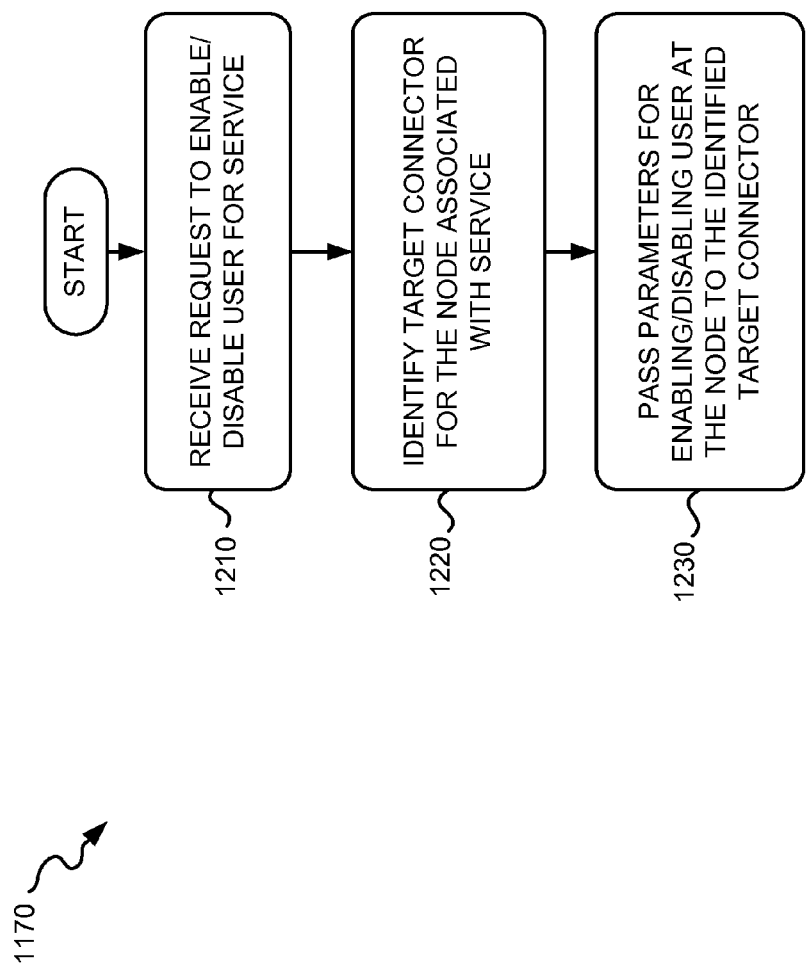

FIG. 12 is a flowchart of an exemplary process for enabling/disabling a user for a service at a node, such as one of nodes 130 (as described above in connection with block 1160). In one embodiment, the process described in FIG. 12 may be performed by service node management component 575. In another embodiment, some or all of the exemplary process described below may be performed by another device/component or combination of devices/components, including or excluding devices/components associated with provisioning platform 120.

The exemplary process may begin with service node management component 575 receiving a request to enable/disable the user for the particular service (block 1210). The request may be received, for example, from service management component 540. The request may include information identifying the user and information identifying the service. In one embodiment, the request may take the form "enableUserForService ('user1234', 'ServiceX')" for enabling user 1234 for service X and the form "disableUserForService ('user1234', 'ServiceX')" for disabling user 1234 for service X.

Service node management component 575 may identify a target connector of target connector component 520 for the node associated with the particular service (block 1220). For example, service node management component 575 may lookup an identifier for the target connector from a computer-readable medium, such as computer-readable medium 600, using an identifier for the particular service (e.g., "ServiceX" in the example above).

Service node management component 575 may pass parameters for enabling/disabling the user at the node to the identified target connector of target connector component 520 (block 1230). In one embodiment, service node management component 575 may request parameters that are to be used for enabling/disabling the user at the node. In one embodiment, nodes 130 may register with a device/component and the device/component may store information indicating which parameters are needed to enable/disable a user for services at nodes 130. Service node management component 575 may request the appropriate parameters from the device/component. The request may include information identifying the user and the service. Once the parameters have been received, service node management component 575 may pass the parameters to the identified target connector. The value for each parameter that is passed may be the values received from the device/component except during the following circumstances:

There is a registered statement for the parameter at service node management component 575 indicating that the parameter must be assigned the value of another parameter. In this case, service node management component 575 may make the assignment before passing the parameter to the target connector.

If the parameter name registered on the node was not received from the device/component (or if the parameter had no value), a default value for the parameter registered at service node management component 575 may be used. If there is no default value registered, service node management component 575 may provide an indication that the user cannot be enabled/disabled for the service at the node (e.g., possibly indicating that it was not possible to obtain a value for a mandatory parameter).

Figure 13:
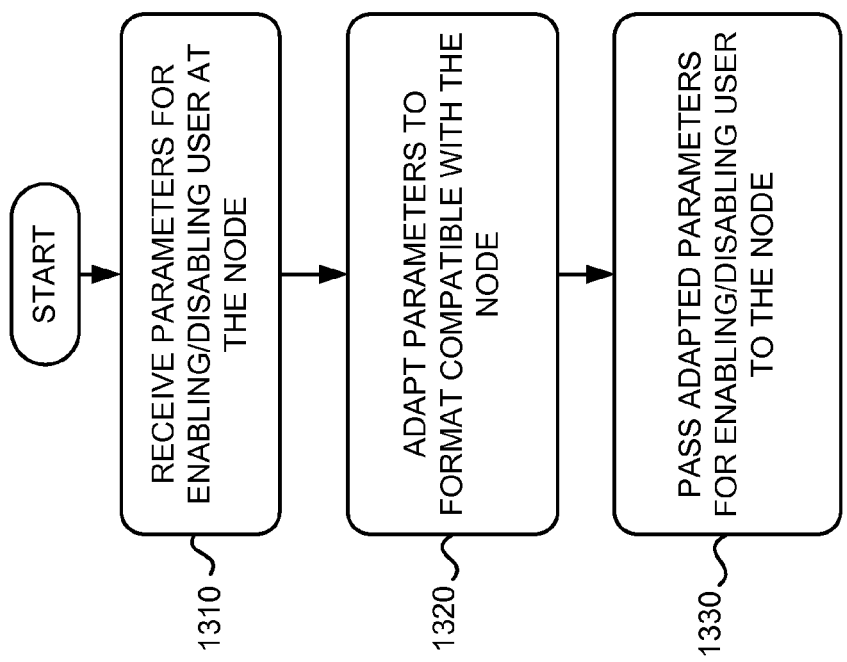
FIG. 13 is a flowchart of an exemplary process for enabling/disabling a user at a node.

FIG. 13 is a flowchart of an exemplary process for enabling/disabling a user for a service at a node, such as one of nodes 130. In one embodiment, the process described in FIG. 13 may be performed by a target connector of target connector component 520. In another embodiment, some or all of the exemplary process described below may be performed by another device/component or combination of devices/components, including or excluding devices/components associated with provisioning platform 120.

The exemplary process may begin with the target connector receiving parameters for enabling/disabling the user at the node (block 1310). The parameters may be received from, for example, service node management component 575. The parameters may include those parameters that are needed by the node to enable/disable the user at the node.

The target connector may adapt the parameters to a format compatible with the node (block 1320). For example, the parameters may be adapted by combining the parameters in some manner, splitting the parameters, etc. By adapting the format of the parameters, nodes 130 can be updated or replaced without affecting the operation of provisioning platform 120. Any changes in the requirements of the parameters needed by the node can simply be conveyed to the target connector associated with the node and, thus, the target connector may ensure that any received parameters are adapted to the appropriate format.

The target connector may pass the adapted parameters to the node (block 1330). For example, the target connector may pass the adapted parameters according to a protocol used by the node.

Figure 14A:
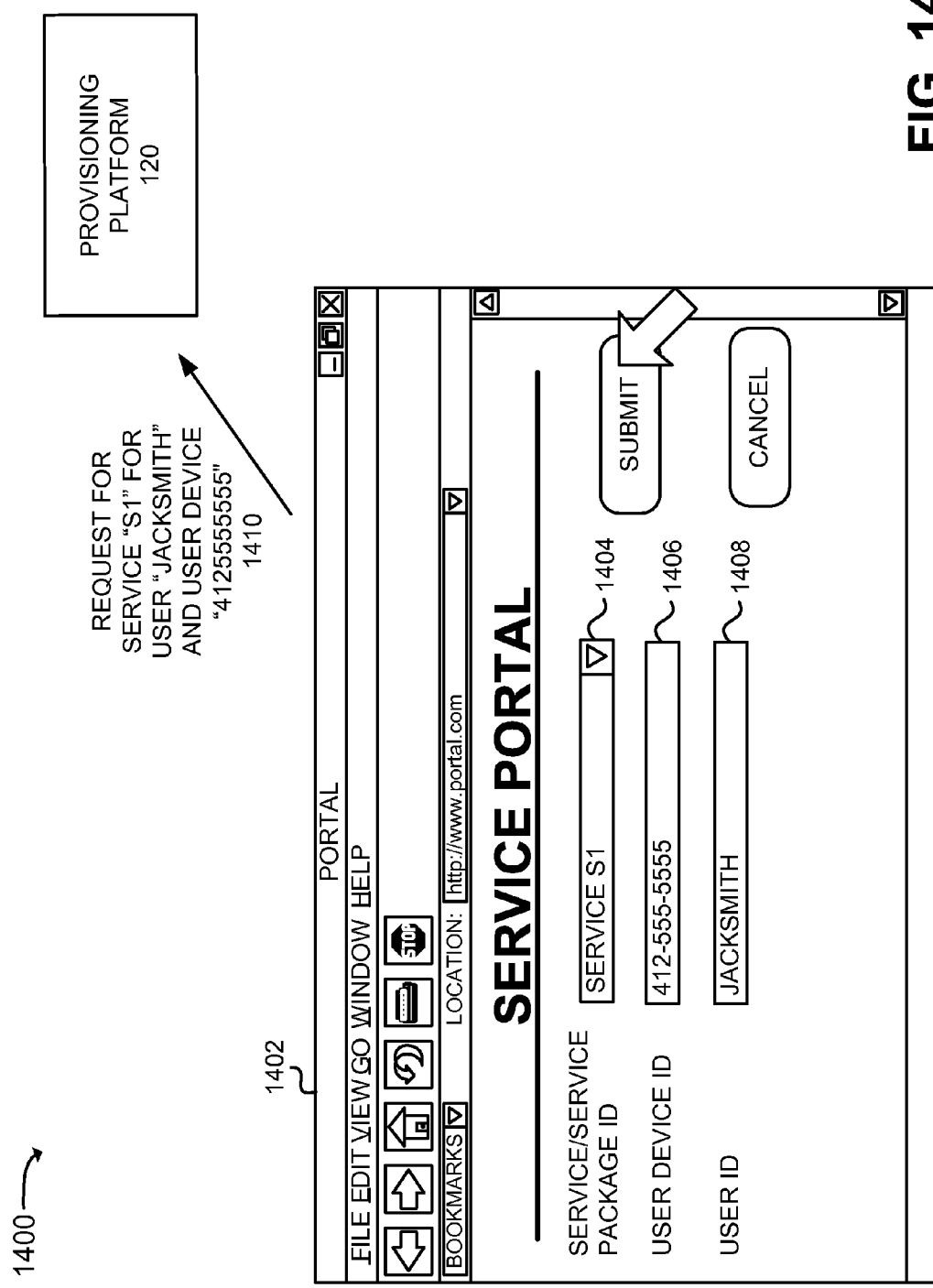
FIGS. 14A-14E are an example of the processing described above with respect to FIGS. 10-13.
Figure 14B:
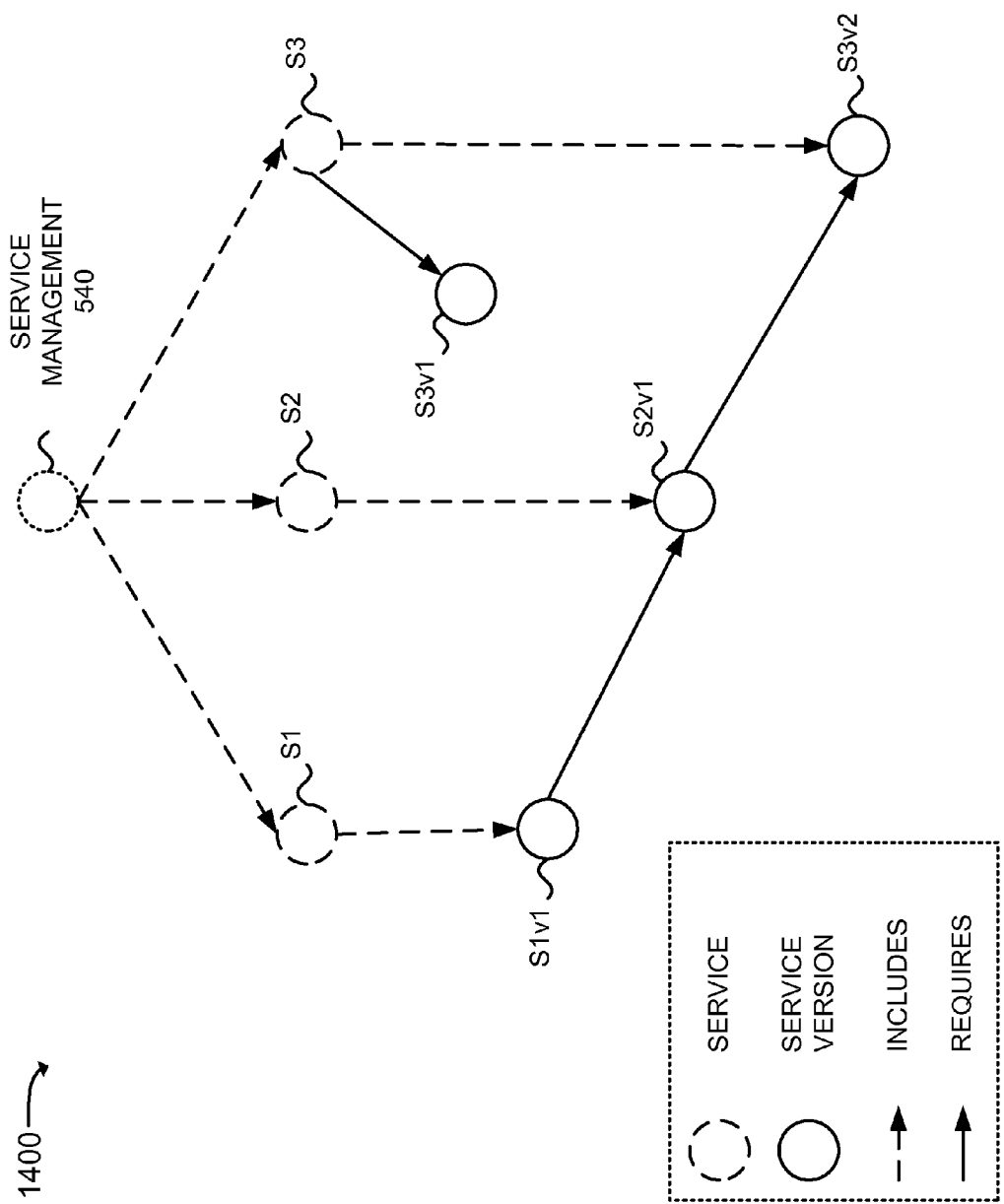

FIGS. 14A-14E are diagrams illustrating an example 1400 of the processing described above with respect to FIGS. 10-13. Assume, for example 1400, that a user wants to sign up for a new service, called "S1." In response, the user may access provisioning platform 120 via, for example, portal component 510. Portal component 510 may provide a graphical user interface 1402 to the user, as illustrated in FIG. 14A. Graphical user interface 1402 may include a service/service package identifier (ID) field 1404 that allows the user to specify the service or service package for which the user desires to be enabled, a user device identifier field 1406 that allows the user to specify an identifier of user device 110 where the service will be used, and a user identifier field 1408 that allows the user to specify an identifier for the user. In example 1400, assume that the user has specified a service "S1" in field 1404, a user device identifier of "412-555-5555" in field 1406, and a user identifier of "JACKSMITH" in field 1408 and selected the SUBMIT button.

In response to selecting the SUBMIT button, user device 110 (on which it is assumed that graphical user interface 1402 is displayed) may submit a request 1410 to provisioning platform 120. Provisioning platform 120 may receive request 1410 and determine the latest version of service S1. For example, provisioning platform 120 may provide a request to service management component 540. Assume, for example 1400, that service management component 540 maintains the service relationship illustrated in FIG. 14B. Thus, based on the service relationship in FIG. 14B, provisioning platform 120 may determine that service S1 includes a single version v1. Provisioning platform 120 may further determine if service S1v1 requires any other services. Based on the service relationship in FIG. 14B, provisioning platform 120 may determine that service S1v1 requires service S2v1, which in turn requires service S3v2.

Figure 14C:
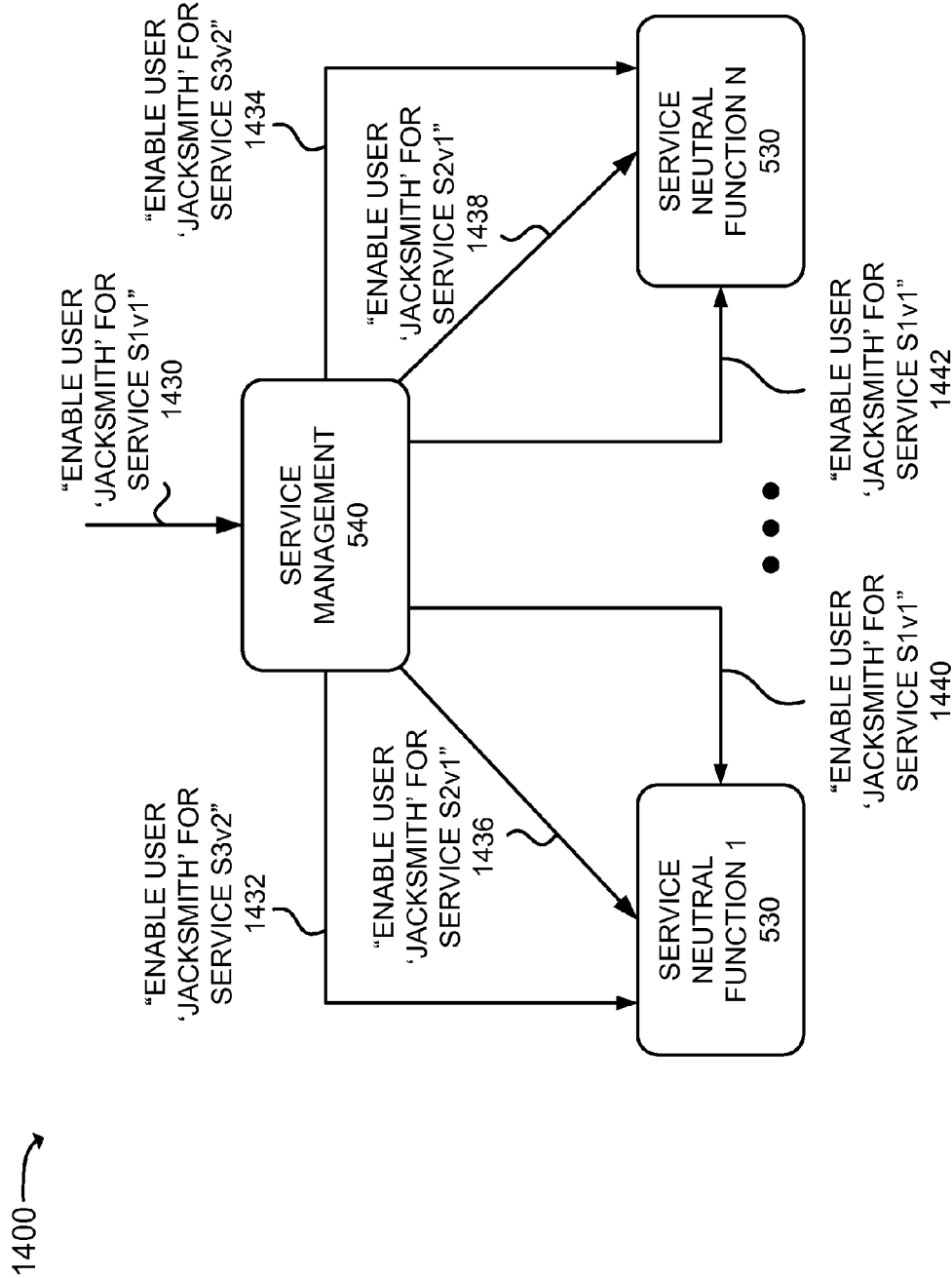

Provisioning platform 120 may send an enablement request for user "JACKSMITH" for service "S1v1" to service neutral functions 530. For example, as illustrated in FIG. 14C, provisioning platform 120 may send a request 1430 to service management component 540. In response to receiving request 1430, service management component 540 may send requests for enabling user "JACKSMITH" to service neutral functions 530. In one embodiment, service management component 540 may attempt to first enable user "JACKSMITH" for the service at the bottom of the hierarchy of services (the hierarchy being S1v1→S2v1→S3v2 in example 1400). Thus, service management component 540 may send enablement requests 1432/1434 to service neutral functions 1-N 530 to enable user "JACKSMITH" for service S3v2.

Service management component 540 may send enablement requests 1432/1434 to service neutral functions 530 for processing in a particular sequence or in parallel. Service management component 540 may send enablement requests 1436/1438 to service neutral functions 1-N 530 to enable user "JACKSMITH" for service S2$v$1. Service management component 540 may send enablement requests 1436/1438 to service neutral functions 530 after user "JACKSMITH" has been successfully enabled for service S3$v$2. Service management component 540 may send enablement requests 1440/1442 to service neutral functions 1-N 530 to enable user "JACKSMITH" for service S1$v$1. Service management component 540 may send enablement requests 1440/1442 to service neutral functions 530 after user "JACKSMITH" has been successfully enabled for service S2$v$1. In other embodiments, service management component 540 may send enablement requests 1440/1442 at other times.

Figure 14D:
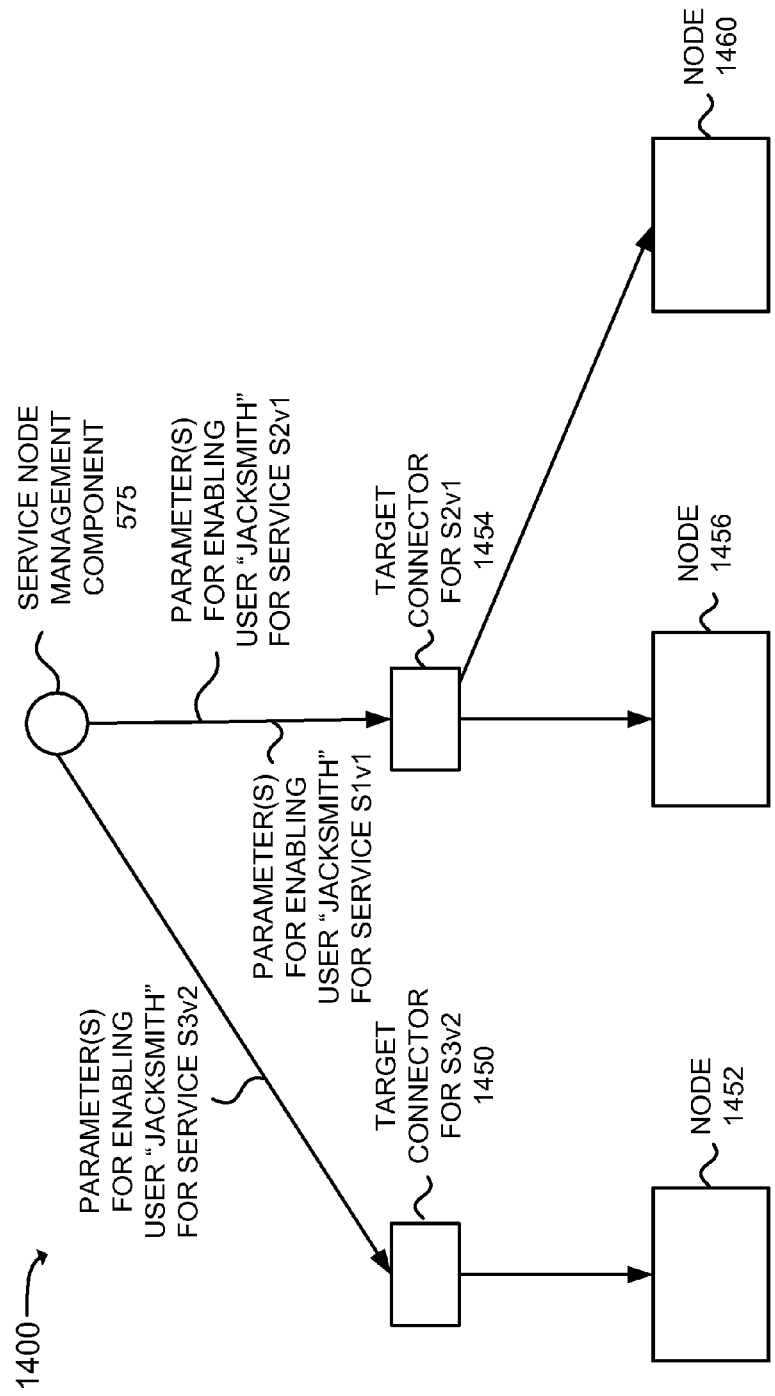

In response to receiving the enablement requests, service neutral functions 530 may process the requests and provide an indication of whether the processing was successful or unsuccessful. For example, as illustrated in FIG. 14D, service node management component 575 may identify a target connector 1450 for the node (identified as node 1452) associated with service S3$v$2. Service node management component 575 may pass the appropriate parameters for enabling/disabling user "JACKSMITH" at node 1452 to target connector 1450. Target connector 1450 may convert the parameters into a format compatible with node 1452 and may pass the converted parameters to node 1452. Node 1452 may receive the converted parameters and attempt to enable user "JACKSMITH" for service S3$v$2. Node 1452 may provide an indication of whether user "JACKSMITH" was successfully enabled for service S3$v$2 to provisioning platform 120.

Similarly, service node management component 575 may identify a target connector 1454 for the node (identified as node 1456) associated with service S2$v$1. Service node management component 575 may pass the appropriate parameters for enabling/disabling user "JACKSMITH" at node 1456 to target connector 1454. Target connector 1454 may convert the parameters into a format compatible with node 1456 and may pass the converted parameters to node 1456. Node 1456 may receive the converted parameters and attempt to enable user "JACKSMITH" for service S2$v$1. Node 1456 may provide an indication of whether user "JACKSMITH" was successfully enabled for service S2$v$1 to provisioning platform 120.

Service node management component 575 may further identify target connector 1454 for the node (identified as node 1460) associated with service S1$v$1. Thus, in this example, target connector 1454 is associated with both of nodes 1456 and 1460. Service node management component 575 may pass the appropriate parameters for enabling/disabling user "JACKSMITH" at node 1460 to target connector 1454. Target connector 1454 may convert the parameters into a format compatible with node 1460 and may pass the converted parameters to node 1460. Node 1460 may receive the converted parameters and attempt to enable user "JACKSMITH" for service S1$v$1. Node 1460 may provide an indication of whether user "JACKSMITH" was successfully enabled for service S1$v$1 to provisioning platform 120.

Figure 14E:
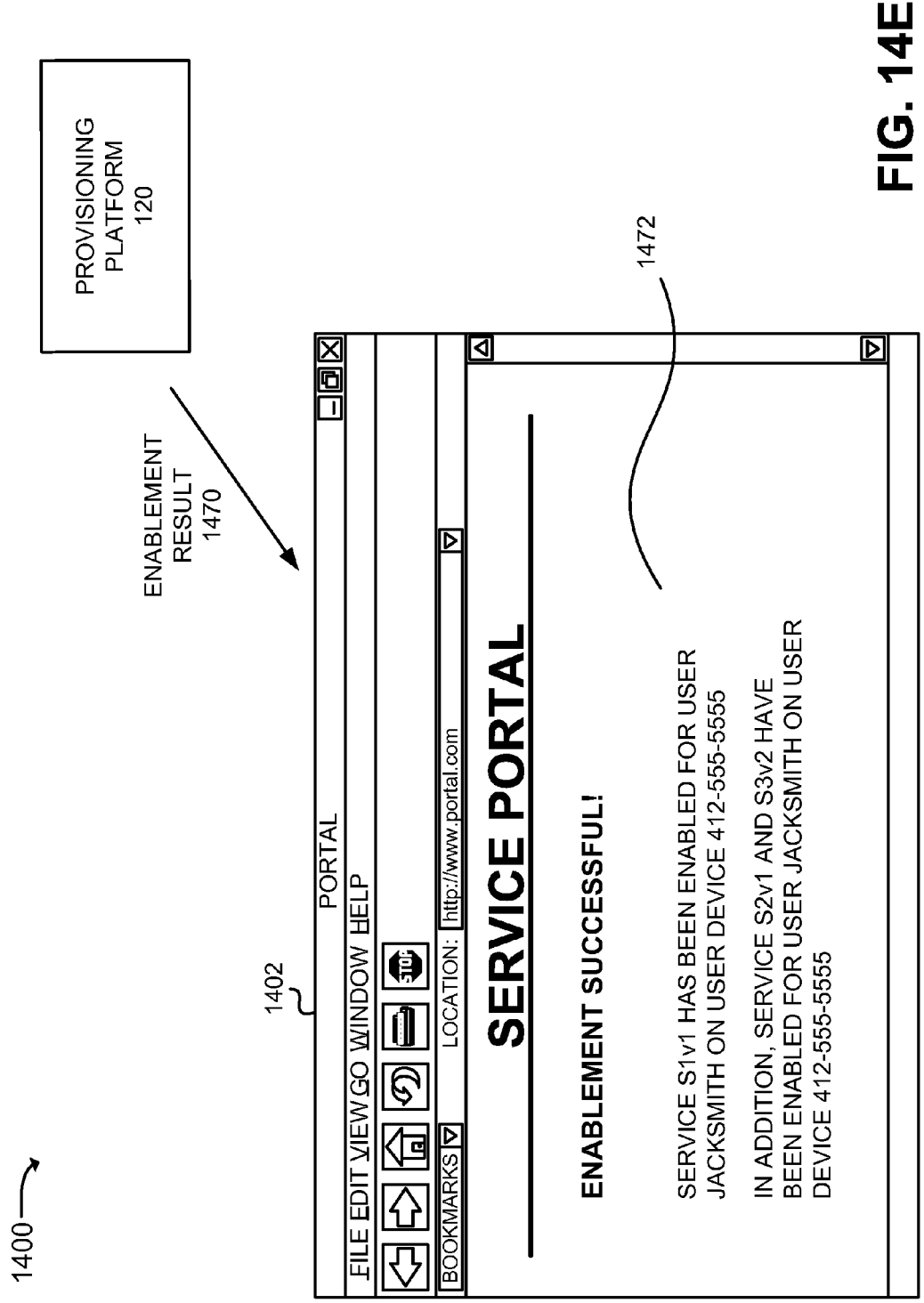

If user "JACKSMITH" was successfully enabled for services S3$v$2, S2$v$1, and S1$v$1, provisioning platform 120 may provide an enablement result 1470 to user device 110 for display in graphical user interface 1402, as illustrated in FIG. 14E. In response, graphical user interface 1402 may provide a message 1472 to the user. Message 1472 may indicate that the user has been successfully enabled for service S1$v$1. Moreover, message 1472 may identify the other services (e.g., services S2$v$1 and S3$v$2) for which the user was enabled.

The provisioning platform described herein enables/disables a user for a desired service or a desired service package. The provisioning platform may invoke a group of registered service neutral functions for the desired service and for each service that is required (either directly or indirectly) by the desired service. In this way, new management functions can be easily incorporated into an overall service management solution. Moreover, the provisioning platform maintains information about intricate service dependencies, thereby allowing a very large number of services to be efficiently managed. The provisioning platform also makes it possible to manage nodes in an efficient way. For example, the provisioning platform considers configuration parameters for enabling/disabling users at nodes to belong to particular services. As such, it is possible to enable/disable a user at a node without manual intervention.

Embodiments described herein provide illustration and description, but is not intended to be exhaustive or to limit the implementations to the precise form disclosed. Modifications and variations are possible in light of the above teachings, or may be acquired from practice of the implementations. For example, while series of blocks have been described with regard to FIGS. 8-13, the order of the blocks may be modified in other embodiments. Further, non-dependent blocks may be performed in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in the this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method for enabling or disabling a user for a first service, the method comprising:

receiving a request to enable or disable a user for the first service;

identifying a second service that is required by the first service from a service management component that stores information about services and information indicating relationships between services;

executing, based on the received request, at least one service neutral function common for all services for a specific purpose, the service neutral function including software code and/or configuration for the second service, to enable or disable the user for the identified second service;

executing, after executing the at least one service neutral function for the second service, said at least one service neutral function for the first service to enable or disable the user for the first service;

wherein executing to enable or disable the user for the first service comprises: executing, after executing a plurality of service neutral functions for the second service, said at least one service neutral function for the first service to enable or disable the user for the first service; and aborting the execution to enable or disable the user for the first service when the user cannot be enabled or disabled for the identified second service.

2. The computing device-implemented method of claim 1, where the information indicating relationships between services comprises one or more of:

information identifying service versions that are associated with each service, information identifying whether each service is part of a service package, information identifying whether a service package is part of another service package, information identifying whether a service version requires another service version in order to operate, or information identifying whether a service version requires one of a number of other service versions in order to operate.

3. The computing device-implemented method of claim 1, where the executing at least one service neutral function to enable or disable the user for the identified second service comprises:

identifying a first node relating to the identified second service, adapting, via a first target connector associated with the identified first node, at least one first parameter into a format compatible with the identified first node, and transmitting the adapted at least one first parameter to the identified first node to enable or disable the user at the identified first node.

4. The computing device-implemented method of claim 3, further comprising:

identifying the first target connector based on information identifying the second service.

5. The computing device-implemented method of claim 3, where the executing at least one service neutral function to enable or disable the user for the first service comprises:

identifying a second node relating to the first service, adapting, via a second target connector associated with the identified second node, at least one second parameter into a format compatible with the identified second node, and transmitting the adapted at least one second parameter to the identified second node to enable or disable the user at the identified second node.

6. The computing device-implemented method of claim 1, further comprising:

providing a message, indicating that the enablement or disablement of the user for the first service has failed, when the user has not been successfully enabled or disabled for at least one of the identified second service or the first service.

7. The computing device-implemented method of claim 1, further comprising:

determining, prior to executing the at least one service neutral function, whether it is possible to enable or disable the user for the first service; and determining, when it is determined to be possible to enable or disable the user for the first service, whether it is possible to enable or disable the user for the second service.

8. The method of claim 1, wherein receiving the request to enable or disable the user for the first service comprises:

receiving the request to enable or disable a wireless user device of the user for the first service, wherein the first service comprises a service provided to wireless user devices via a wireless communications network.

9. A non-transitory computer-readable device storing executable instructions that, when executed by processing logic, perform a method according to claim 1.

10. A system comprising:

a provisioning platform that is configured to:

receive a request to enable or disable a user for a first service, identify a second service that is required by the first service from a service management component that defines a relationship between the first service and the identified second service, perform at least one service neutral function common for all services for a specific purpose, the service neutral function including software code and/or configuration for the second service to enable or disable the user for the identified second service, perform the at least one service neutral function to enable or disable the user for the first service;

perform the at least one service neutral function to enable or disable the user for the first service after performing a plurality of service neutral functions for the second service; and abort enabling or disabling the user for the first service when the user cannot be enabled or disabled for the identified second service.

11. The system of claim 10, where the service management component stores information for a plurality of services, the information comprising one or more of:

information identifying service versions that are associated with each service of the plurality of services, information identifying whether each service of the plurality of services is part of a service package, information identifying whether a service package is part of another service package, information identifying whether a service version requires another service version in order to operate, or information identifying whether a service version requires one of a number of other service versions in order to operate.

12. The system of claim 10, where when executing at least one service neutral function to enable or disable the user for the identified second service, the provisioning platform is configured to:

identify a first node relating to the identified second service, and transmit at least one first parameter to enable or disable the user at the identified first node.

13. The system of claim 12, further comprising:
a first target connector, associated with the identified first node, configured to:
receive the at least one first parameter,
adapt the at least one first parameter into a format compatible with the identified first node, and
transmit the adapted at least one first parameter to the identified first node.

14. The system of claim 12, where, when executing at least one service neutral function to enable or disable the user for the first service, the provisioning platform is configured to:
identify a second node relating to the first service, and
transmit at least one second parameter to enable or disable the user at the identified second node.

15. The system of claim 14, further comprising:
a second target connector, associated with the identified second node, configured to:
receive the at least one second parameter,
adapt the at least one second parameter into a format compatible with the identified second node, and
transmit the adapted at least one second parameter to the identified second node.

16. The system of claim 12, where the provisioning platform is further configured to:
identify the first target connector based on information identifying the second service.

17. The system of claim 10, where the provisioning platform is further configured to:
provide a message, indicating that the enablement or disablement of the user for the first service has failed, when the user has not been enabled or disabled for at least one of the identified second service or the first service.

* * * * *